(12) United States Patent
Kurokawa et al.

(10) Patent No.: US 7,594,083 B2
(45) Date of Patent: Sep. 22, 2009

(54) STORAGE SYSTEM AND STORAGE CONTROL DEVICE

(75) Inventors: Midori Kurokawa, Odawara (JP); Azuma Kano, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 11/515,734

(22) Filed: Sep. 6, 2006

(65) Prior Publication Data

US 2008/0005514 A1    Jan. 3, 2008

(30) Foreign Application Priority Data

Jun. 6, 2006    (JP)    ............... 2006-157256

(51) Int. Cl.
  G06F 12/00    (2006.01)
  G06F 13/00    (2006.01)
  G06F 13/28    (2006.01)
(52) U.S. Cl. .................. 711/154; 711/111; 711/112; 711/114; 711/163
(58) Field of Classification Search .................. 711/163
  See application file for complete search history.

(56) References Cited

U.S. PATENT DOCUMENTS 5,720,028 A * 2/1998 Matsumoto et al. ............ 714/9
6,640,281 B2 * 10/2003 Obara et al. ................ 711/114
2003/0188104 A1 * 10/2003 Sullivan ...................... 711/119
2003/0204683 A1 * 10/2003 Okumoto et al. ............ 711/147
2005/0172097 A1    8/2005 Voigt et al.
2005/0251620 A1    11/2005 Matsunami et al.

FOREIGN PATENT DOCUMENTS

JP    2005-353035    12/2005

OTHER PUBLICATIONS

U.S. Appl. No. 11/331,115, filed Jan. 2006, Matsunami et al.

* cited by examiner

*Primary Examiner*—Kevin L Ellis
*Assistant Examiner*—Ryan Bertram
(74) *Attorney, Agent, or Firm*—Brundidge & Stanger, P.C.

(57) ABSTRACT

The storage system according to the present invention allows the number of host connections to be increased by connecting a plurality of storage control devices so that commands and data can be directly exchanged between each storage control device. The first storage control device has a plurality of controllers, and the second storage control device also has a plurality of controllers. Within each storage control device, controllers are connected by inter-controller communication paths. Also, between storage control devices, controllers belonging to different storage control devices are connected by inter-device communication paths. If the subject of processing of a command received by one storage control device is under the control of another storage control device, the command is transferred from the one storage control device to the other storage control device via the inter-device communication path.

12 Claims, 21 Drawing Sheets

FIG. 4

HOUSING MANAGEMENT TABLE (T1)

T11 — BASIC HOUSING 1

| HOUSING IDENTIFICATION NO. | BASIC HOUSING NO. | EXTENSION HOUSING NO. |
|---|---|---|
| 10 | 1 | — |
| 11 | 1 | 1 |
| 12 | 1 | 2 |
| 13 | 1 | 3 |
| ... | ... | ... |
| 1N | 1 | N |

T12 — BASIC HOUSING 2

| HOUSING IDENTIFICATION NO. | BASIC HOUSING NO. | EXTENSION HOUSING NO. |
|---|---|---|
| 20 | 2 | — |
| 21 | 2 | 1 |
| 22 | 2 | 2 |
| 23 | 2 | 3 |
| ... | ... | ... |
| 2N | 2 | N |

...

T1M — BASIC HOUSING M

| HOUSING IDENTIFICATION NO. | BASIC HOUSING NO. | EXTENSION HOUSING NO. |
|---|---|---|
| M0 | M | — |
| M1 | M | 1 |
| M2 | M | 2 |
| M3 | M | 3 |
| ... | ... | ... |
| MN | M | N |

FIG. 5

DRIVE MANAGEMENT TABLE ~T2

| RAID GROUP NO. | RAID LEVEL | HOUSING IDENTIFICATION NO. | DRIVE NO. LIST |
|---|---|---|---|
| 1 | 5 | 11 | 1,2,3,4 |
| 2 | 1 | 12 | 5,6 |
| 3 | 5 | 12 | 7,8,9,10 |
| ... | ... | ... | ... |

FIG. 6

CONTROLLER MANAGEMENT TABLE ~T3

| CONTROLLER IDENTIFICATION NO. | BASIC HOUSING NO. | CONTROLLER TYPE |
|---|---|---|
| 1A | 1 | A |
| 1B | 1 | B |
| 2A | 2 | A |
| 2B | 2 | B |
| ... | ... | ... |

FIG. 7

VOLUME MANAGEMENT TABLE ~T4

| LU NO. | CONTROLLER IDENTIFICATION NO. | RAID GROUP NO. | RAID GROUP START POSITION | CAPACITY |
|---|---|---|---|---|
| 0 | 1A | 1 | LBA10 | VS1 |
| 1 | 1A | 1 | LBA11 | VS2 |
| 2 | 1A | 2 | LBA20 | VS3 |
| 3 | 2B | 10 | LBA30 | VS4 |
| ... | ... | ... | ... | ... |

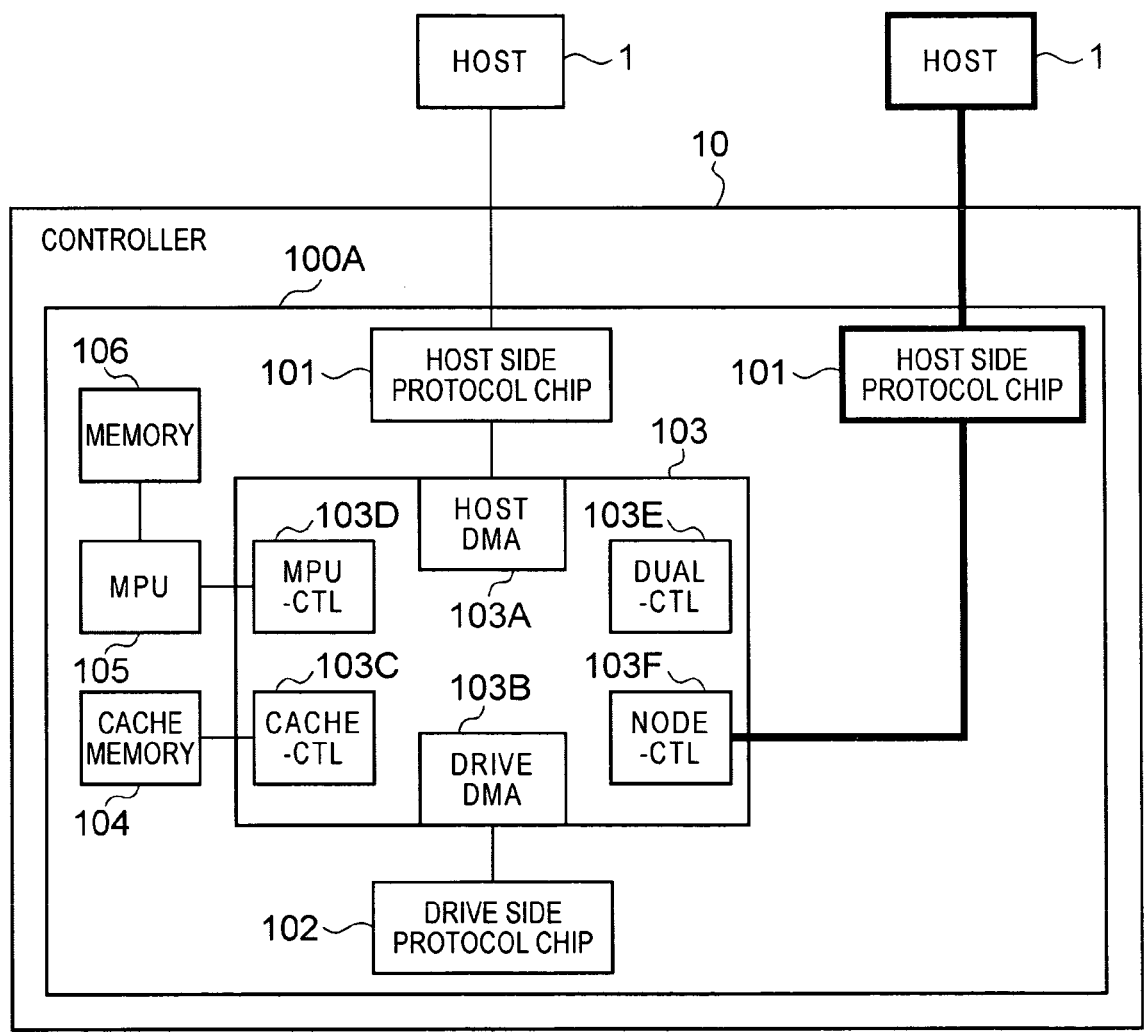

STORAGE SYSTEM AND STORAGE CONTROL DEVICE

CROSS-REFERENCE TO RELATED APPLICATIONS

This application relates to and claims priority from Japanese Patent Application No. 2006-157256 filed on Jun. 6, 2006, the entire disclosure of which is incorporated herein by reference.

BACKGROUND OF THE INVENTION

1. Field of the Invention

The present invention relates to a storage system and a storage control device.

2. Description of the Related Art

Many types of data controlled by for example, companies, hospitals, Government organizations, and other organizations, are managed by storage control devices. Storage control devices include for example a plurality of hard disks, and provide storage capacity based on a Redundant Array of Independent Disks (RAID) to a host computer (hereafter referred to as the host). As the amount of data controlled by companies and other organizations grows from day to day, the storage capacity of storage control devices can become insufficient. When the storage capacity becomes insufficient it is possible to deal with it by increasing the storage capacity by adding a new hard disk to the storage control device, or moving old data from the storage control device to a tape device or similar.

On the one hand the number of hosts using storage control devices is increasing. The number of hosts that can be connected to a storage control device is limited by the specification of the storage control device, so it is generally difficult to connect a number of hosts that exceeds the specification. Therefore, in this case it is possible to replace an existing storage control device to which few hosts can be connected with another storage control device to which many hosts can be connected, or, increase the number of storage control devices.

If the number of storage control devices is increased, data is moved from existing storage control devices to the newly added storage control devices. Then, using path switching software provided on the host or switches or similar, the host accesses the storage control device on which the desired data exists (Japanese Patent Application Laid-open No. 2005-353035).

In the conventional art described in the above document, each host must determine every time which storage control device of a plurality of storage control devices to access. Therefore it is necessary to carry out access path switching setting for each host, and so on, which takes time for managing the storage system. Also, it is necessary to install software to carry out switching of the access path on each host, which increases the cost of the storage system.

SUMMARY OF THE INVENTION

With the foregoing problem points in mind, it is an object of the present invention to provide a storage system and storage control device in which the processing path can be switched on the storage control device side, without the awareness of the upper level device. Another object of the present invention is to provide a storage system and storage control device for which the number of upper level devices that can be connected can be simply increased, by connecting a plurality of storage control devices at the same level. Further objects of the of the present invention will become clear from the embodiments described later.

In order to solve the above problems, the storage system according to the present invention includes a plurality of storage control devices connected to upper level devices, wherein each storage control device has controllers that control communication with the upper level devices and storage devices, inter-device communication paths for connecting each of the controllers in each storage control device is provided, and each controller can access memory provided in connection destination controllers connected via the inter-device communication paths without going through the upper level devices.

In one aspect of the present invention, each controller comprises: an upper level communication control unit that carries out communication with the upper level device; a lower level communication control unit that carries out communication with the storage devices; the memory that is used by the upper level communication control unit and the lower level communication control unit; a data transfer control unit that controls data transfer between the upper level communication control unit and the memory, and the lower level communication control unit and the memory; and a processor that controls the operation of the controller, wherein the data transfer control unit comprises an inter-device interface unit for connecting to the inter-device communication path.

In one aspect of the present invention, each controller accesses the memory of the connection destination controller via the inter-device communication path when the storage device for which access is requested by the upper level device is under the control of the connection destination controller.

In one aspect of the present invention, each controller transfers the command and/or data received from the upper level device to the connection destination controller via the inter-device communication path when the storage device for which access is requested by the upper level device is under the control of the connection destination controller.

In one aspect of the present invention, the upper level communication control unit in each controller comprises a command transfer function that transfers commands received from the upper level device to a specified transfer destination, and when the storage device for which access is requested by the upper level device is under the control of the connection destination controller, the upper level communication control unit transfers the command and/or data received from the upper level device to the connection destination controller via the inter-device interface unit and the inter-device communication path.

In one aspect of the present invention, each controller stores the write data associated with the write command in their respective memories, and also stores the write data associated with the write command in the memory of the connection destination controllers when receiving a write command from the upper level device.

In one aspect of the present invention each controller stores the write data associated with the write command in their respective memory when receiving a write command from the upper level device, regardless of whether the subject of the write command is a storage device under the control of the controller or a storage device under the control of the connection destination controller, and transfers and stores the write data associated with the write command in the memory of the connection destination controller if the subject of the write command is a storage device under the control of the connection destination controller.

In one aspect of the present invention, each controller deletes the write data stored in the memory after transferring and storing the write data in the memory of the connection destination controller.

In one aspect of the present invention, a first write mode and a second write mode for processing write commands received from the upper level device are prepared in advance, and each storage device can be set in advance to one of either the first write mode or the second write mode, (1) when the storage device that is the subject of the write command is set to the first write mode, the write data associated with the write command is stored in the memory of a connection source controller that has received the write command and the memory of the connection destination controller connected to the connection source controller via the inter-device communication path, (2) when the storage device that is the subject of the write command is set to the second write mode, after storing the write data associated with the write command in the memory of the connection source controller, it is determined whether the storage device that is the subject of the write command is a storage device under the control of the connection destination controller, and when it is determined that the storage device that is the subject of the write command is a storage device under the control of the connection destination controller, the write data is transferred to and stored in the memory of the connection destination controller.

In one aspect of the present invention, when the second write mode is set, and furthermore a data delete mode in which the write data stored in the memory of the connection source controller is deleted can be set, and when the data delete mode is set, after transferring and storing the write data to the memory of the connection destination controller, the write data stored in the memory of the connection source controller is deleted.

In one aspect of the present invention, each storage control device comprises a first controller and a second controller mutually connected via an inter-controller communication path, and both the first controller and the second controller can mutually back up the other controller.

In one aspect of the present invention, a plurality of inter-device communication paths are provided, and when one of the inter-device communication paths cannot be used, another inter-device communication path can be used.

In one aspect of the present invention, each controller monitors the load on storage devices under its own control, and when a high load storage device is detected having a load equal to or greater than a threshold value that is set in advance, control of the high load storage device is entrusted to the connection destination controller connected via the inter-device communication path.

In one aspect of the present invention, the inter-device interface unit can be connected to an upper level communication control unit separate from the upper level communication control unit instead of the inter-device communication path.

A storage control device in accordance with another aspect of the present invention comprises: a housing; and a first controller and a second controller provided within the housing, wherein the first controller and the second controller each comprise: an upper level communication control unit that carries out communication with an upper level device; a lower level communication control unit that carries out communication with a storage devices; a memory used by the upper level communication control unit and the lower level communication control unit; a data transfer control unit that controls data transfer between the upper level communication control unit and the memory, and the lower level communi- cation control unit and the memory; and a processor that controls the operation of the controller, and the data transfer control unit comprises: an inter-controller interface unit for connection to an inter-controller communication path that connects the first controller and the second controller; and an inter-device interface unit for connection to an inter-device communication path that connects to a corresponding controller in another storage control device.

At least a part of each constituent element of the present invention may be implemented by a computer program. Also, this computer program may be distributed in a fixed state on various types of storage media, or transmitted via communication media.

BRIEF DESCRIPTION OF THE DRAWINGS

FIG. 4 is an explanatory diagram showing the table for controlling the housing;

FIG. 5 is an explanatory diagram showing the table for controlling the memory drive;

FIG. 6 is an explanatory diagram showing the table for controlling the controller;

FIG. 7 is an explanatory diagram showing the table for controlling the volume;

FIG. 23 is a block diagram of the controller of a storage control device according to the sixth embodiment.

DESCRIPTION OF THE SPECIFIC EMBODIMENTS

Figure 1:
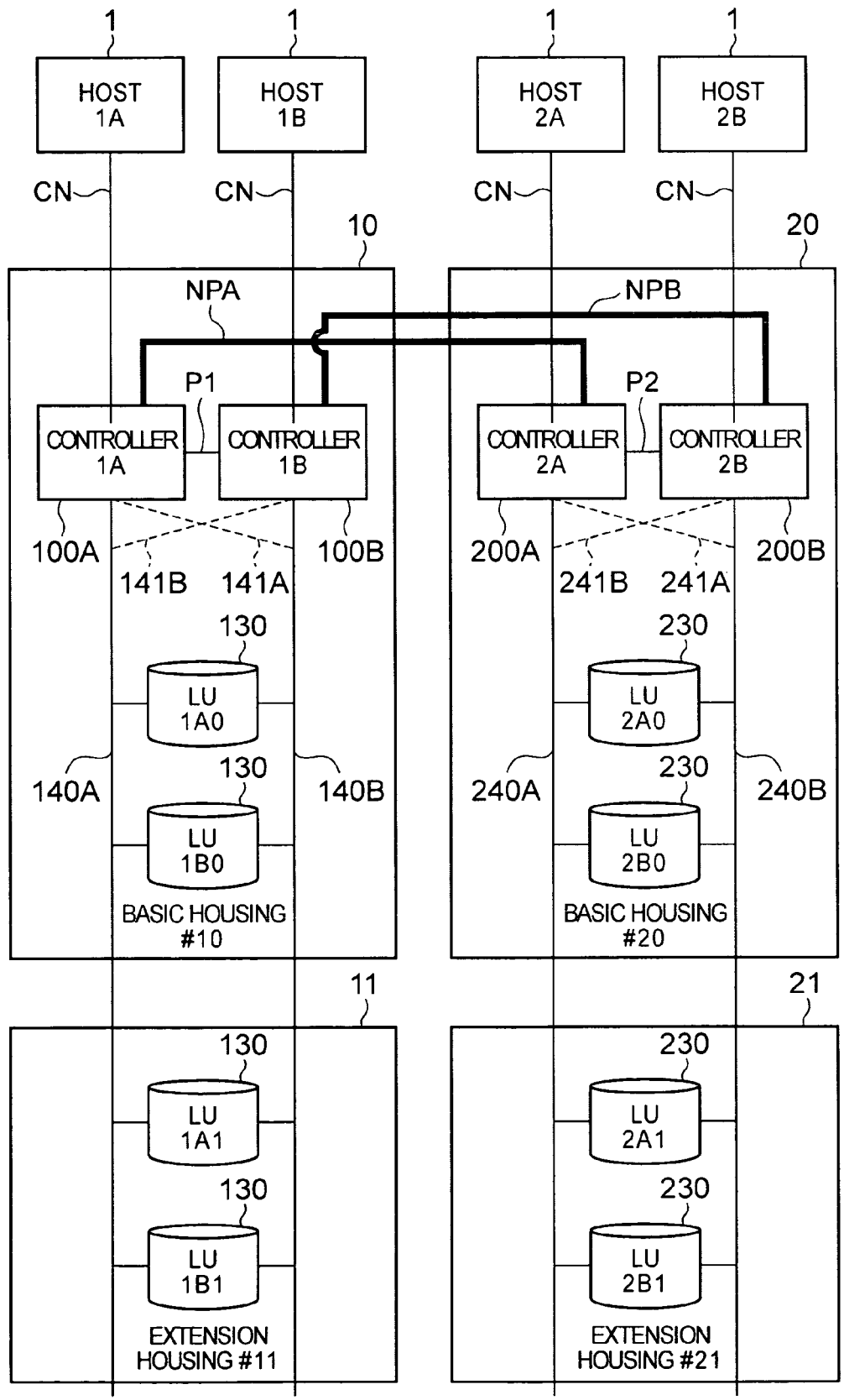
FIG. 1 is an explanatory diagram showing the overall configuration of the storage system according to an embodiment of the present invention.

The following is an explanation of the embodiments of the present invention, based on the drawings. In the present embodiment, as shown in FIG. 1, for example a plurality of storage control devices 10, 20 set in a mutually equal relationship are connected via inter-device communication paths NPA, NPB, and the storage control devices 10, 20 determine which storage control device 10, 20 handles access requests from a host 1. In this way, software or similar to control the path to access the storage control devices 10, 20 from the host 1 is not installed on the host 1, the configuration of the storage system can be expanded by a comparatively simple method, and the number of hosts 1 connected can be increased.

First Embodiment

FIG. 1 is an explanatory diagram showing the overall configuration of the storage system according to the present embodiment. The storage system includes a plurality of hosts 1 that can be connected to a plurality of storage control devices 10, 20 respectively. In the following explanation, the explanation is given for an example where each storage control device 10, 20 is the same type of storage control device. However, the present invention is not limited to this, and each storage control device 10, 20 may be a different type. Also, as described in a different embodiment, the storage system may also include three or more storage control devices.

In the following explanation, the storage control device 10 is sometimes referred to as the first storage control device 10 or the former storage control device 10, and the storage control device 20 is sometimes referred to as the second storage control device 20 or the latter storage control device 20, respectively.

The host 1 is for example a computer device such as a personal computer, a server computer, a mainframe, or an engineering workstation. The host 1 is connected to the storage control device 10, 20 via a communication path CN such as for example a Storage Area Network (SAN), or a Local Area Network (LAN), or the like.

Any one or a plurality of hosts 1 from among the hosts 1 may be provided with storage control software to control the configuration of the storage control devices 10, 20. In this case, a user of the storage system can generate a logical volume 130 or set the access paths and the like using the storage control software on the host 1. A computer device for control other than the host 1 may also be used for controlling the configuration of the storage control devices 10, 20.

The storage control device 10 includes a first controller 100A a second controller 100B, and a plurality of logical volumes 130 connected to each controller 100A, 100B via communication paths 140A, 140B housed within a housing. The storage control device 10 is a basic device including both a control function (controllers 100A, 100B) and a storage function (130), and may be referred to as a basic housing.

When increasing the storage capacity of a storage control device 10, an extension housing 11 is connected to the storage control device 10. The extension housing 11 includes logical volume 130 only, and does not have a control function. The logical volume 130 within the extension housing 11 is controlled by the controllers 100A, 100B. In this embodiment an example has been shown in which two controllers 100A, 100B are provided within the storage control device 10, but the present invention is not limited to this, and one or three or more controllers may be provided.

The storage control device 10 includes a plurality of controllers 100A, 100B, as stated above. Here, in the drawings the system associated with the first controller 100A is referred to as the "A system", and the system associated with the second controller 100B is referred to as the "B system". In the drawings an element labeled with the reference numeral "1A" is an element that belongs to the A system within the first storage control device 10. An element labeled with the reference numeral "1B" is an element that belongs to the B system within the first storage control device 10. The same applies to the second storage control device 20. An element labeled with the reference numeral "2A" is an element that belongs to the A system within the second storage control device 20. An element labeled with the reference numeral "2B" is an element that belongs to the B system within the second storage control device 20.

As stated above, each controller 100A, 100B is connected to their respective host 1 via the communication path CN. In the drawings, for convenience of explanation each controller 1100A, 100B is connected to one host 1each. However, in reality each controller 100A, 100B can be connected to a plurality of hosts 1. The number of hosts 1 that can be connected to the controllers 100A, 100B is determined by the number of communication ports (host side protocol chip 101 in FIG. 3) possessed by each controller 100A, 100B.

Each controller 100A, 100B is connected to each logical volume 130 via fiber channel or similar communication paths 140A, 140B. In other words, the first controller 100A is connected to each logical volume 130 via the first communication path 140A. The second controller 100B is connected to each logical volume 130 via the second communication path 140B. Also, the first controller 100A is connected to the second communication path 140B via an alternative path 141A, and in the same way the second controller 100B is connected to the first communication path 140A via an alternative path 141B.

Under normal conditions the first controller 100A accesses the logical volume 130 via the communication path 140A. If a fault occurs on the communication path 140A, the controller 100A can access the logical volume 130 via the alternative path 141A and the communication path 140B. In the same way, under normal conditions the second controller 100B accesses the logical volume 130 via the communication path 140B. If a fault occurs on the communication path 140B, the controller 100B can access the logical volume 130 via the alternative path 141B and the communication path 140A.

However, as stated later, the present embodiment includes an inter-controller communication path P1 connected between each controller 100A, 100B, and inter-device communication paths NPA, NPB connected between the controllers 100A, 100B in the former storage control device 10 and the controllers 200A, 200B in the latter storage control device 20.

Therefore, for example, by transmitting commands and data to the controller 100B via the communication path P1, the controller 100A can make the controller 100B access the logical volume 130. Also, by transmitting commands and data to the controller 200A in the latter storage control device 20 via the inter-device communication path NPA, the controller 100A can make the controller 200A access the logical volume 230.

In the same way, by transmitting commands and data to the controller 100A via the communication path P1, the controller 100B can make the controller 100A access the logical volume 130. Also, by transmitting commands and data to the controller 200B via the inter-device communication path NPB, the controller 100B can make the controller 200B access the logical volume 230.

Furthermore, as stated later, depending on circumstances the inter-controller communication paths P1, P2 and the inter-device communication paths NPA, NPB can be appropriately combined and used. For example, the controller 100A can transmit commands and data to the controller 200B via the communication path P1, the controller 100B, and the inter-device communication path NPB. The inter-device communication paths NPA, NPB may also be called inter-node communication paths.

The inter-controller communication paths P1, P2 and the inter-device communication paths NPA, NPB can be configured as for example serial interfaces such as PCI (Peripheral Component Interconnect) Express. In this way, the command transmission function provided in the host side protocol chip can be effectively utilized, and it is possible to reduce the overhead during transfer.

In this way, in the present embodiment, when the controller 100A accesses the logical volumes 130 under the control of the controller 100A, either the communication path 140A or the alternative path 141A and the communication path 140B are used. In other words, when the controller 100A receives commands to be processed by the controller 100A from the host 1, the controller 100A accesses the target logical volume 130 using the communication path 140A or the alternative path 141A.

In contrast, when the controller 100A receives commands concerning the logical volumes under the control of other controllers (100B, 200A, 200B), the commands are transferred to the controller that should process the commands (the responsible controller). In this way, the commands are processed by the controller that is responsible for processing those commands. In the above, the controller 100A was used in the explanation, but the same applies to controllers 100B, 200A, 200B.

In the present embodiment, the second storage control device 20 has the same configuration as the first storage control device 10. In other words, the second storage control device 20 includes the first controller 200A, the second controller 200B, and logical volumes 230 connected to each controller 200A, 200B via the communication paths 240A, 240B, housed in a housing that is different from the housing of the first storage control device 10. An extension housing 21 including logical volumes 230 can be connected to the second storage control device 20. The number of logical volumes 130 controlled by the first storage control device 10 maybe different from the number of logical volumes 230 controlled by the second storage control device 20. When necessary a user can add extension housings 11, 21 as appropriate.

The logical volumes 130, 230 are explained by reference to FIG. 2. In the following the explanation is focused on the logical volume 130. The logical volume 130 (230) is a physical storage device provided in a physical storage area having one or a plurality of storage drives 110 (210).

Figure 2A:
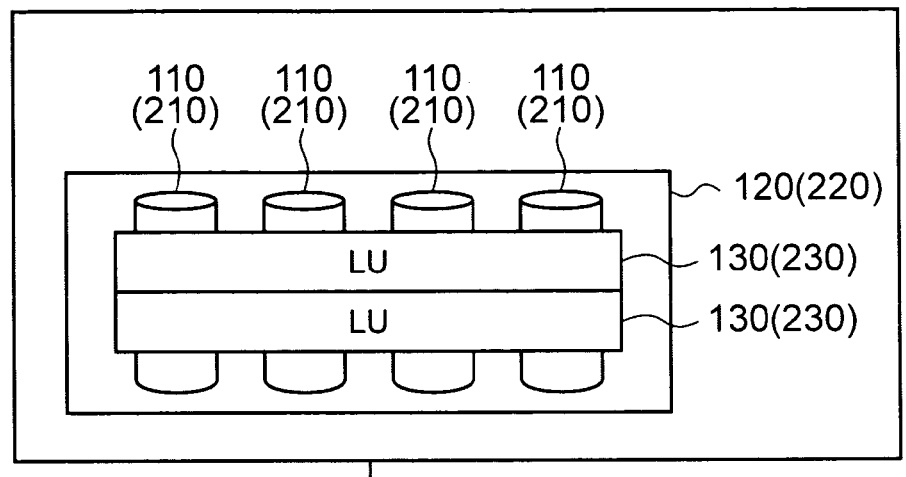
FIG. 2 is an explanatory diagram showing the relationship between the memory drive, the RAID group, and the logical volume.
Figure 2B:
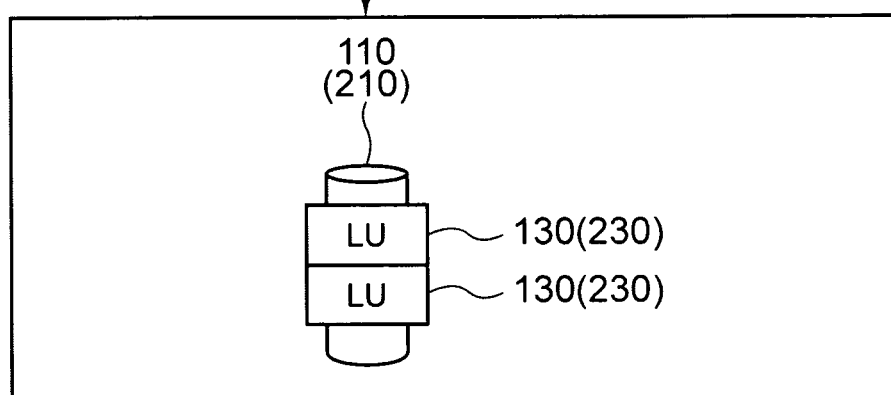

As shown in FIG. 2A, the physical storage area of a plurality of storage drives 110 (210) can be grouped as a RAID group (parity group) 120 (220). A plurality of logical volumes 130 (230) can be set in this RAID group 120 (220). As shown in FIG. 2B, one or a plurality of logical volumes 130 (230) can be provided in a single storage drive 110 (210).

Various types of device to which data can be written and from which data can be read can be used as the storage device 110 (210), for example, hard disk devices, semiconductor memory devices, optical disk devices, opto-magnetic disk devices, magnetic tape devices, and flexible disk devices. If hard disk devices are used, for example FC (Fiber Channel) disks, SCSI (Small Computer System Interface) disks, SATA disks, ATA (AT Attachment) disks, or SAS (Serial Attached SCSI) disks may be used. If semiconductor memory devices are used, various types of memory device may be used, for example flash memory, FeRAM (Ferroelectric Random Access Memory), MRAM (Magnetoresistive Random Access Memory), phase change memory (Ovonic Unified Memory), or RRAM (Resistance RAM).

Different types of storage drive may be mixed. For example, the storage drives 110 controlled by the first storage control device 10 may be a first type of storage drive, and the storage drives 210 controlled by the second storage control device 20 may be a second type of storage drive. Or, the storage drives (for example, semiconductor memory) within the basic housings 10, 20 and the storage drives (for example, hard disks) within the extension housings 11, 21 may be different types. Furthermore, in at least one of the basic housings 10, 20 or the extension housings 11, 21 different types of storage drives may be mixed.

Figure 3:
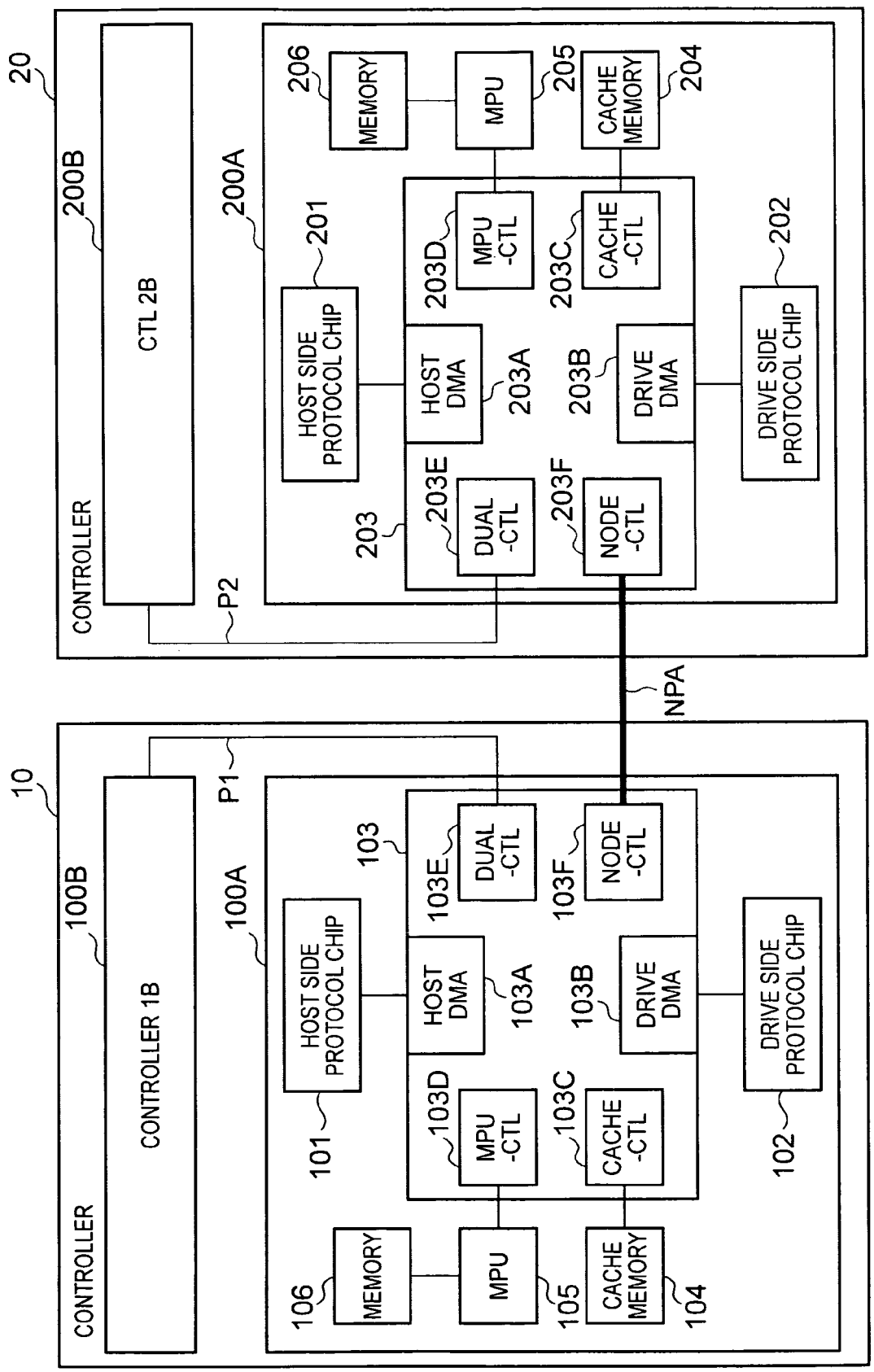
FIG. 3 is a block diagram showing the configuration of the controller.

The following is an explanation of the configuration of each controller 100A, 100B, 200A, 200B, referring to FIG. 3. In the present embodiment, each controller 100A, 100B, 200A, 200B has the same configuration, so the explanation will be focused on the controller 100A. In the following explanation, when there is no particular need to make a distinction, controller 100A, 100B is abbreviated to controller 100, and controller 200A, 200B is abbreviated to controller 200.

The controller 100A includes for example a host side protocol chip 101, a drive side protocol chip 102, a data transfer control circuit 103, a cache memory 104, a processor ("MPU" in the drawings) 105, and a memory 106.

The host side protocol chip 101 is connected to an interface in the host 1 via the communication path CN, and is responsible for communications with the host 1. As described later, the host side protocol chip 101 has the function of analyzing commands received from the host 1, and transferring the commands to the controller (processor) that should process the command. This function can also be referred to as for example the command transfer function, the command distribution function, the command dispatch function, and so on.

The drive side protocol chip 102 is connected to each storage drive 110 via the communication path 140A, and is responsible for communications with the storage drives 110. The data transfer control circuit 103 is described later.

The cache memory 104 stores write data received from the host 1 or read data read from the logical volume 130, and similar. The cache memory 104 can also store control information or management information such as tables T1~T4 that are described later. Also, in the present embodiment, as described later, between controllers in the same housing or between controllers in separate housings, data stored in cache memory 104 can be multiply controlled. If the cache memory 104 is constituted from volatile memory, the stored contents of the cache memory 104 is maintained by a battery or cell power supply.

The processor 105 controls the overall operation of the controller 100A. The processor 105 processes requests issued from the host 1, by for example reading and executing a program recorded in the memory 106.

The data transfer control circuit 103 can be configured to include for example a host DMA (Direct Memory Access) circuit 103A, a drive DMA circuit 103B, a cache side data transfer circuit 103C, a processor side data transfer circuit 103D, an inter-controller communication circuit 103E, and an inter-device communication circuit 103F.

The host DMA circuit 103A carries out data transfer (DMA transfer) between the host side protocol chip 101 and the cache memory 104. The drive DMA circuit 103B carries out data transfer (DMA transfer) between the drive side protocol chip 102 and the cache memory 104.

The cache side data transfer circuit 103C is responsible for data input to and output from the cache memory 104. This circuit 103C can for example calculate and apply a check code for each predetermined size of data, and look up already applied check codes. The processor side data transfer circuit 103D is responsible for data input to and output from the processor 105.

The inter-controller communication circuit 103E carries out communication with the other controller 100B provided in the same housing via the inter-controller communication path P1. The inter-device communication circuit 103F carries out communication with the controller 200A within another housing via the inter-device communication path NPA. In the present embodiment, the controller 100A within the first storage control device 10 corresponds to the controller 200A within the second storage control device 20, and the controller 100B within the first storage control device 10 corresponds to the controller 200B within the second storage control device 20. The inter-device communication paths NPA, NPB are communication paths connected between corresponding controllers in separate housings (storage control devices).

The controller 100B within the first storage control device 10 has the same configuration as the controller 100A, so the explanation is omitted. The controller 200A within the second storage control device 20 likewise has the same configuration as the controller 100A. In other words, the controller 200A is configured to include for example a host side protocol chip 201, a drive side protocol chip 202, a data transfer control circuit 203, a cache memory 204, a processor 205, and a memory 206.

The data transfer control circuit 203 can be configured to include for example a host DMA circuit 203A, a drive DMA circuit 203B, a cache side data transfer circuit 203C, a processor side data transfer circuit 203D, an inter-controller communication circuit 203E, and an inter-device communication circuit 203F.

The inter-controller communication circuit 203E carries out communication with the other controller 200B provided in the same housing via the inter-controller communication path P2. The inter-device communication circuit 203F is connected to the inter-device communication circuit 103F of the controller 100A via the inter-device communication path NPA. The controller 200B within the second storage control device 20 has the same configuration as the controller 200A, so the explanation is omitted.

The following is an explanation of the table structure for controlling the storage control devices 10, 20, referring to FIGS. 4 through 7. In the following explanation, each table T1~T4 can be stored in for example cache memory 104, 204.

FIG. 4 shows an example of the configuration of a management table T1 for controlling the housing of each storage control device 10, 20. This housing management table T1 includes basic housing management tables T11, T12, ... T1M for controlling each basic housing respectively.

Each basic housing table T11 and similar, is formed from for example corresponding housing identification numbers, basic housing numbers, and extension housing numbers. The housing identification number is information to uniquely identify each housing within the storage system. For example, if each housing is provided with a DIP switch, rotary switch, or similar, the housing identification number for each housing can be set using this switch.

The basic housing number is information associated with that basic housing that identifies the basic housing. For example, the basic housing number "1" is set for the housing associated with the first storage control device 10, and the basic housing number "2" is set for the housing associated with the second storage control device 20. The extension housing number is information to identify extension housings connected to the same basic housing. By using a housing management table T1 such as that shown in FIG. 4, it is possible to identify and control each housing within the storage system.

FIG. 5 shows an example of a table T2 for controlling the drives 110, 210. This drive management table T2 is formed from for example corresponding RAID group numbers, RAID level, housing identification numbers, and drive number list.

The RAID group number is information for uniquely identifying each RAID group 120, 220 within the storage system. The RAID level is information indicating the RAID configuration of the RAID group. The housing identification number is information for identifying the housing in which the RAID group is provided. The drive number list is information indicating the storage drives 110, 210 that are included in the RAID group. By using this type of table T2, it is possible to control which RAID group 120, 220 of the storage system is provided in each housing, and what storage drives 110, 210 are included in each RAID group, and so on.

FIG. 6 shows an example of a table T3 for controlling each controller 100A, 100B, 200A, 200B within the storage system. This controller management table T3 is formed from for example corresponding controller identification numbers, basic housing numbers, and controller types.

The controller identification number is information for uniquely identifying each controller 100A, 100B, and so on, within the storage system. The basic housing number is information for identifying the basic housing in which the controller is provided. The controller type is information indicating the control system associated with that controller (in the present embodiment, distinguished as system A or system B). By using this type of table T3, it is possible to control what basic housing a controller is provided in, what control system is associated with the controller, and so on.

FIG. 7 shows an example of a table T4 for controlling each logical volume 130, 230 within the storage system. This volume management table T4 is formed from for example corresponding logical volume numbers ("LUNo." in the drawings), controller identification numbers, RAID group numbers, RAID group start position, and storage volume. The logical volume number is information to uniquely identify each logical volume 130, 230 within the storage system. The controller identification number is information for identifying the controller responsible for input of data to and output of data from the logical volume. The RAID group number is information for identifying the RAID group in which the logical volume is provided. The RAID group start position is address information indicating the position within the RAID group in which the logical volume starts. In other words, the RAID group start position means the address of the top of the logical volume within the RAID group. The storage capacity is information indicating the storage capacity of the logical volume.

In FIG. 7 the basic structure of the volume management table T4 is shown. In practice the table T4 will include information for controlling the setting details of write mode, and so on. A volume management table T4A capable of controlling setting details of write mode and so on will be described later.

Figure 8:
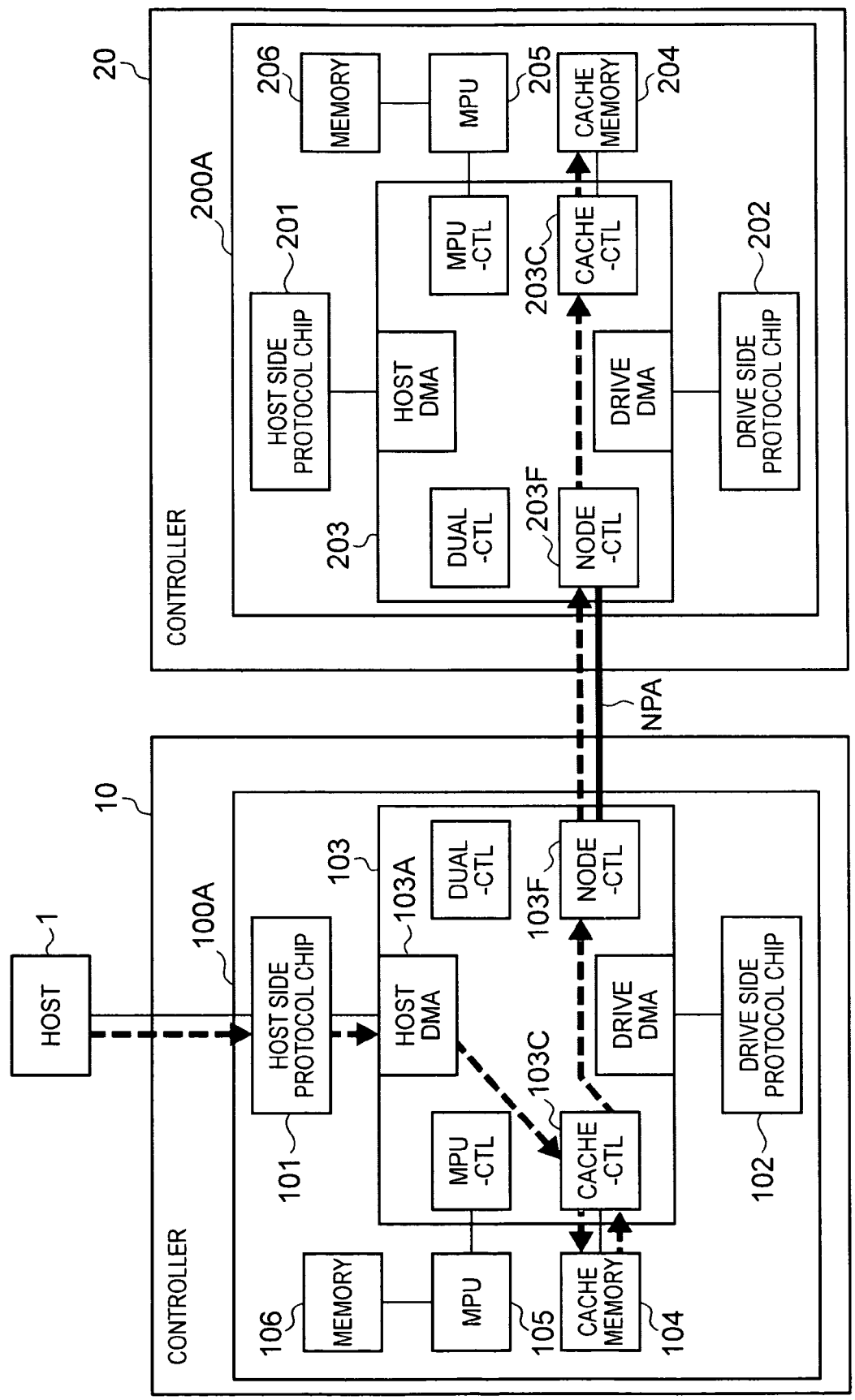
FIG. 8 is an explanatory diagram showing the elements that transmit commands and the like between controllers in different housings.

The following is a description of the operation of the storage system according to the present embodiment based on FIGS. 8 through 11. FIG. 8 is an explanatory diagram showing the transfer of commands and data received from the host 1 between storage control devices 10, 20, without going via the host 1.

In FIG. 8, part of the configuration and reference numerals have been omitted for convenience of explanation. The situation in which the controller 100A receives a write command issued by the host 1, and transfers the write command to the controller 200A is explained.

The write command issued by the host 1 is received by the host side protocol chip 101 of the controller 100A. The write command and write data is stored in the cache memory 104 within the controller 100A, via the host DMA circuit 103A and the cache side data transfer circuit 103C.

Also, the write data stored in the cache memory 104 is transferred from the cache side data transfer circuit 103C to the inter-device communication circuit 103F, and transferred to within the corresponding controller 200A via the inter-device communication path NPA.

The controller 200A is connected to the controller 100A via the inter-device communication path NPA. When the controller 200A is viewed from the controller 100A, the controller 100A is the connection source controller (or the transfer source controller), and the controller 200A is the connection destination controller (or transfer destination controller).

The inter-device communication path 203F within the controller 200A receives the write data transmitted from the controller 100A. This write data is stored from the circuit 203F into the cache memory 204 within the controller 200A via the circuit 203C. In this way, in the present embodiment commands and data can be transferred between the controllers 100A, 200A via the inter-device communication path NPA. Also, commands and data can be transferred between controllers 100B, 200B via the inter-device communication path NPB.

Figure 9:
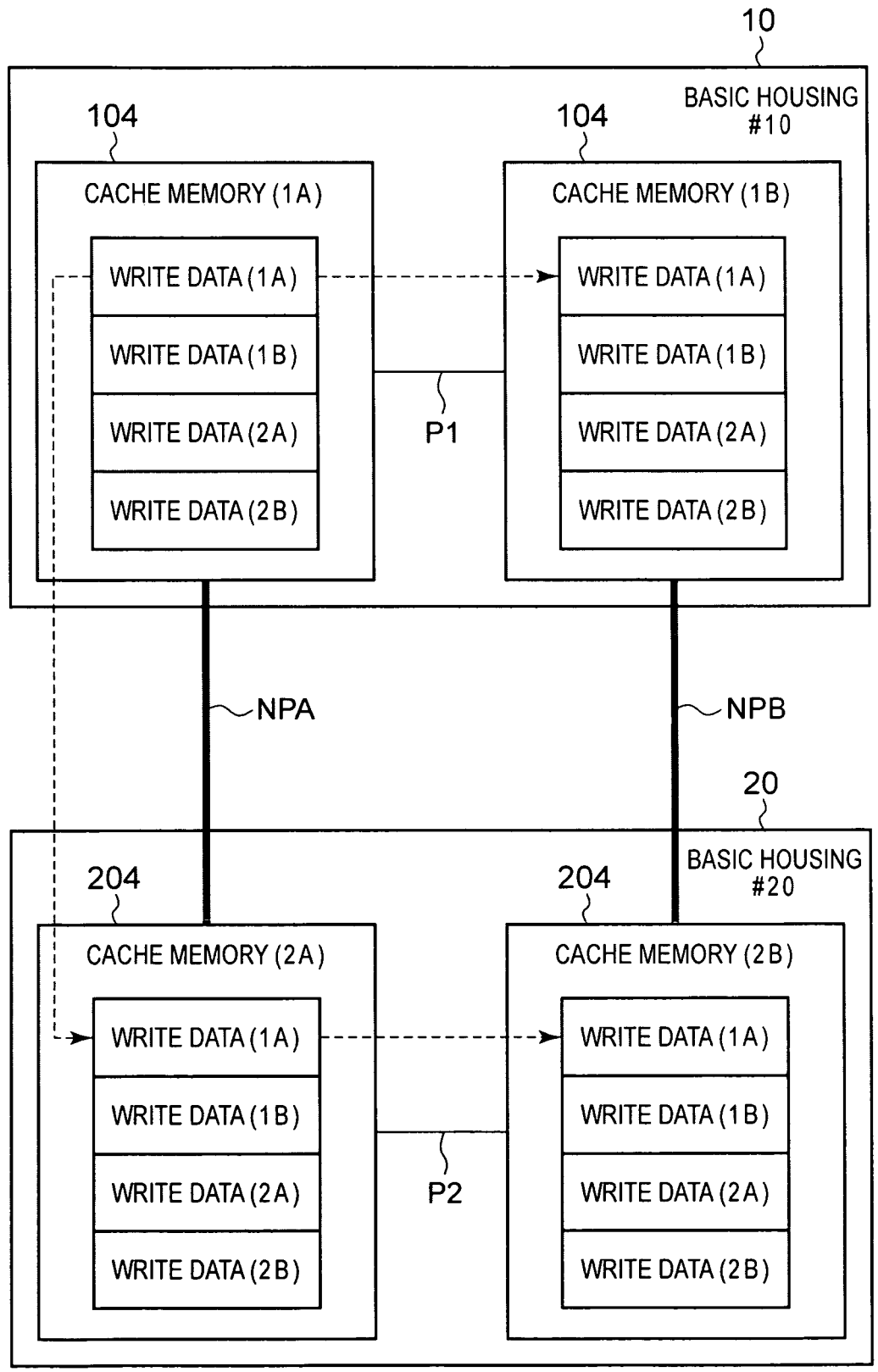
FIG. 9 is an explanatory diagram showing the memory status in the cache memory possessed by each controller.

FIG. 9 shows the relationship between the cache memory 104, 104 in each controller 100A, 100B in the first storage control device 10, and the cache memory 204, 204 in each controller 200A, 200B in the second storage control device 20.

In the present embodiment, the write data received from the host 1 is written to a total of four cache memories 104, 204. This write mode can be referred to as for example the first write mode, quadruplicating write mode, or inter-device multiple write mode.

In FIG. 9, it is assumed that the host 1 issues a write command directed towards the logical volume 130 of the A system under the control of the first storage control device 10. When this write command is received by the controller 100A, the controller 100A stores the write data in the cache memory 104 within the controller 100A.

The controller 100A transfers the write data stored in the cache memory 104 to the controller 100B via the inter-controller communication path P1. The controller 100B stores the write data received from the controller 100A in the cache memory 104 within the controller 100B.

Furthermore, the controller 100A transfers the write data stored in the cache memory 104 to the controller 200A in a separate storage control device 20 via the inter-device communication path NPA. The controller 200A stores the write data received from the controller 100A in the cache memory 204 within the controller 200A. Also, the controller 200A transfers the write data stored in the cache memory 204 to the controller 200B via the inter-controller communication path P2. The controller 200B stores the write data received from the controller 200A in the cache memory 204 within the controller 200B. In this way, in the present embodiment, write data received from the host 1 is stored in four cache memories 104, 204.

Figure 10:
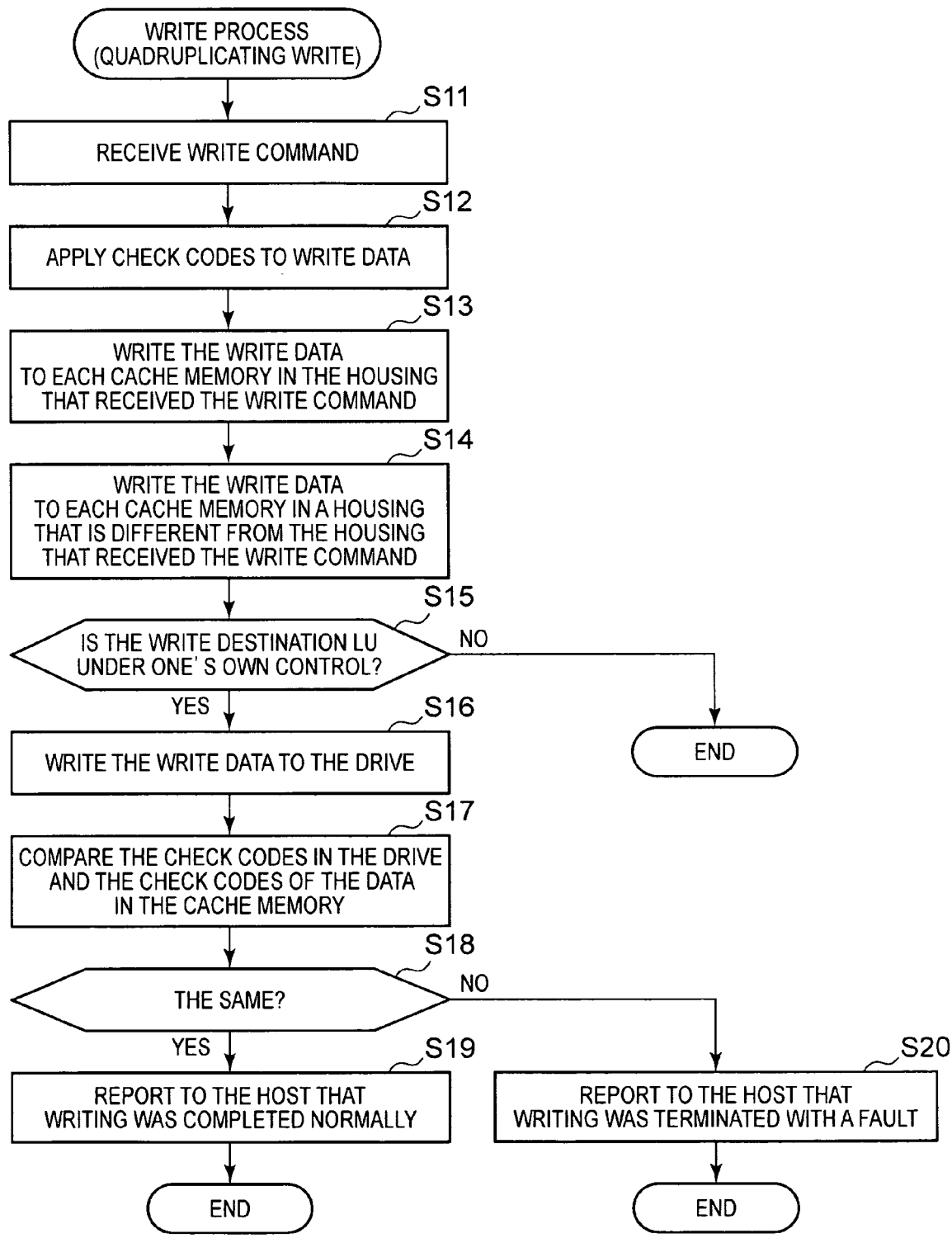
FIG. 10 is a flowchart showing the write process according to the first write mode.

FIG. 10 is a flowchart showing the write process described above. Each of the following flowcharts is a summary of the process to the extent necessary to understand and implement the present invention, and may differ from an actual program. In the following explanation, step is abbreviated to "S". Also, each process described below can be executed by each of the controllers 100A, 100B, 200A, 200B, but to simplify the explanation the explanation is focused on the operation of the controller 100A.

When the controller 100A receives a write command from the host 1 (S11), a check code is applied to the write data received from the host 1 (S12). Here, a check code is information to guarantee the contents of the write data. For example, for every 512 bytes of write data an 8 byte check code is generated and applied to the write data.

The controller 100A multiply controls the write data within the housing within which the controller 100A is located (in this case, within the first storage control device 10) (S13). In other words, the controller 100A transfers the write data to the other controller 100B in the same basic housing (storage control device 10) via the inter-controller communication path P1, and the write data is stored in the cache memory 104 within the controller 100B.

Also, the controller 100A transfers the write data to the controller 200A provided in another basic housing (storage control device 20) via the inter-device communication path NPA, and the write data is multiply controlled within the other basic housing (S14). In other words, the controller 200A stores the write data received from the controller 100A in the cache memory 204 within the controller 200A, and transfers the write data received from the controller 100A to the controller 200B via the inter-controller communication path P2. In this way, the controller 200B stores the write data received from the controller 200A in the cache memory 204 within the controller 200B.

In this way, after multiply controlling the same write data in the different housings, the controller 100A determines whether the logical volume 130 specified as the write destination in the write command is under the control of the controller 100A or not (S15).

If the write command refers to a logical volume 130 under the control of the controller 100A (S15: YES), the controller 100A writes the write data to the prescribed storage drive 110 (S16). The prescribed storage drive 110 is the storage drive that forms the logical volume 130 that is the write destination.

When writing the write data to the storage drive 110, the controller 100A again calculates the check code, and compares this calculated check code with the check code applied in step S12 (S17). The controller 100A determines whether the two check codes are the same (S18).

If both check codes are the same (S18: YES), the controller 100A notifies the host 1 that the write command has been processed normally (S19). If the two check codes are not the same (S18: NO), the controller 100A notifies the host 1 that processing the write command terminated in a fault (S20).

In this way, by dividing the write data into sections of a predetermined size and applying a check code to each section when writing data to a storage drive 110, it is possible to guarantee that the data has been written normally by checking the check codes. Therefore it is possible to increase the reliability of the storage control device 10, 20. However, if this level of reliability is not necessary, applying and checking the check codes may be omitted.

Also, in FIG. 10, the case is shown where after writing the write data to the storage drive 110, the controller 100A reports to the host 1 that writing has been completed. However, the present invention is not limited to this, and a configuration may be used in which the controller 100A, 100B reports to the host 1 that writing has been completed at the point in time when the write data received from the host 1 has been stored in each cache memory 104. In other words, it is possible to notify the host 1 that processing of the write command has been completed before the write data is written to the storage drive 110.

The write data stored in the cache memory 104, 204, 204 of the controllers 100B, 200A, 200B can be deleted at a suitable timing. For example, when the available capacity in the cache memory reduces below a predetermined value, write data for which another controller has responsibility of control can be deleted. For example, in prescribed circumstances, the controller 200A can delete from the cache memory 204 write data for a control volume 130 under the control of the controller 100A.

Figure 11:
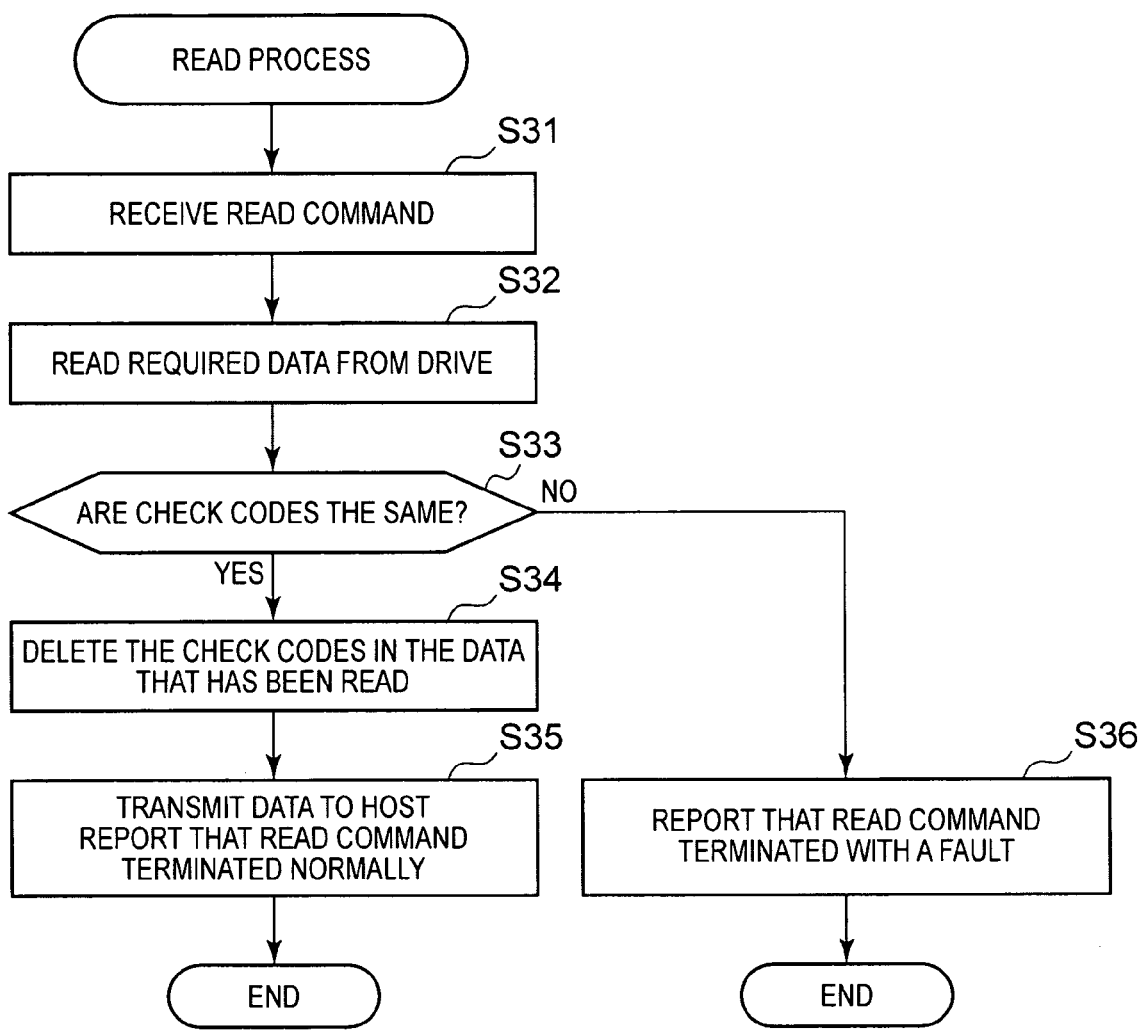
FIG. 11 is a flowchart showing the read process.

FIG. 11 is a flowchart showing the read process. When the controller 100A receives a read command from the host 1 (S31), the data requested in the read command is read from the prescribed storage drive 110 (S32). In other words, the controller 100A reads data of the size specified in the read command from the storage area of the storage device 110 corresponding to the logical address specified in the read command. The check codes calculated at step S12 in FIG. 10 have been applied to this data. The controller 100A reads the data including the check codes.

The controller 100A again calculates the check codes for the data read from the storage drive 110, and compares the calculated check codes with the check codes applied to the data read from the storage drive 110 (S33).

If both check codes are the same (S33: YES), the controller 100A deletes the check codes from the data read from the storage drive 110 (S34). The controller 100A transmits the data from which the check codes have been removed to the host 1, and reports that the read command has been terminated normally (S35).

On the other hand, if both check codes are not the same (S33: NO), the controller 100A notifies the host 1 that the read command has terminated with a fault (S36). If the command terminates with a fault, the host 1 can again issue the command.

Figure 12:
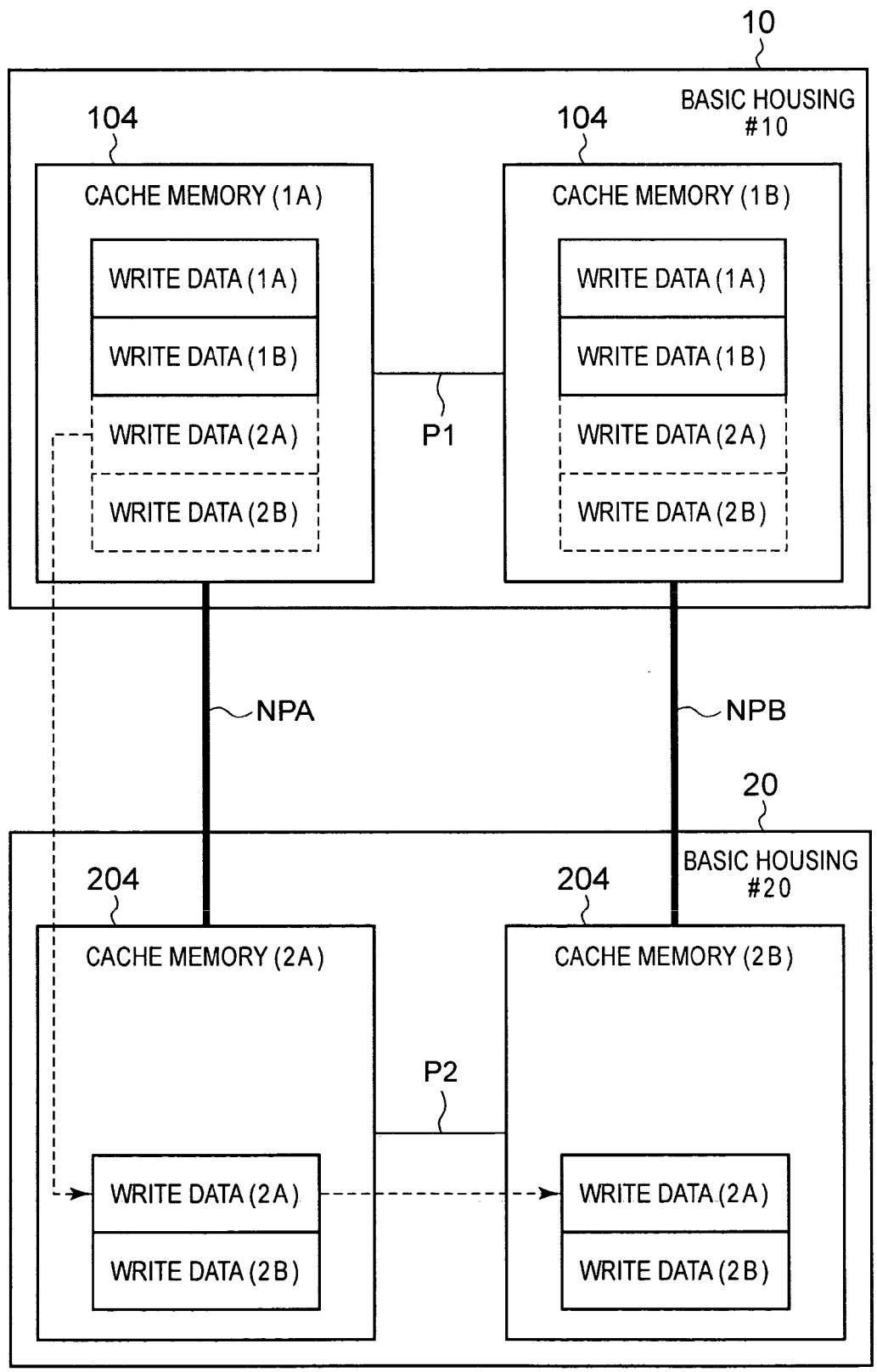
FIG. 12 is an explanatory diagram showing the memory status of each cache memory for the second write mode.

FIG. 12 is an explanatory diagram showing the situation when the second write mode has been set. In FIG. 12, the situation in which a command that is not the responsibility of the controller is received from the host 1, and the command is transferred to the controller responsible for the command.

For example, when the controller 100A receives a write command from the host 1 in connection with a logical volume 230 under the control of the controller 200A, the controller 100A transfers the write command and the write data to the controller 200A which is the responsible controller, via the inter-device communication path NPA.

The controller 200A stores the write data received from the controller 100A in the cache memory 204 within the controller 200A. Also, the controller 200A transfers the write data to the other controller 200B within the same housing, and the write data is stored in the cache memory 204 within the controller 200B.

In other words, as shown in FIG. 12, in the present invention when the second write mode is set, the controller that receives the command (in this example, controller 100A) determines whether the logical volume that is the subject of the received command is under the control of the basic housing in which the controller that has received the command is provided. If the logical volume that is the subject of the received command is not under the control of the basic housing in which the controller that has received the command is provided, the receiving controller transfers the command to the controller that must process the command. The controller that must process the command is the controller that controls the logical volume that is the subject of the command, and is also called the responsible controller.

The controller that receives the command (in the example in FIG. 12, 100A) and the responsible controller (in the example in FIG. 12, 200A) are provided in separate basic housings, and both controllers are connected by the inter-device communication path NPA. Therefore, focusing on the transfer of the command and the data, the controller that has received the command is the connection source controller, and the responsible controller is the connection destination controller. After the controller that receives the command has transferred the write data to the responsible controller, the write data stored in the cache memory within the controller that has received the command can be deleted. The second write mode described above can also be referred to as for example the duplicating write mode or the intra-device duplicating write mode.

Figure 13:
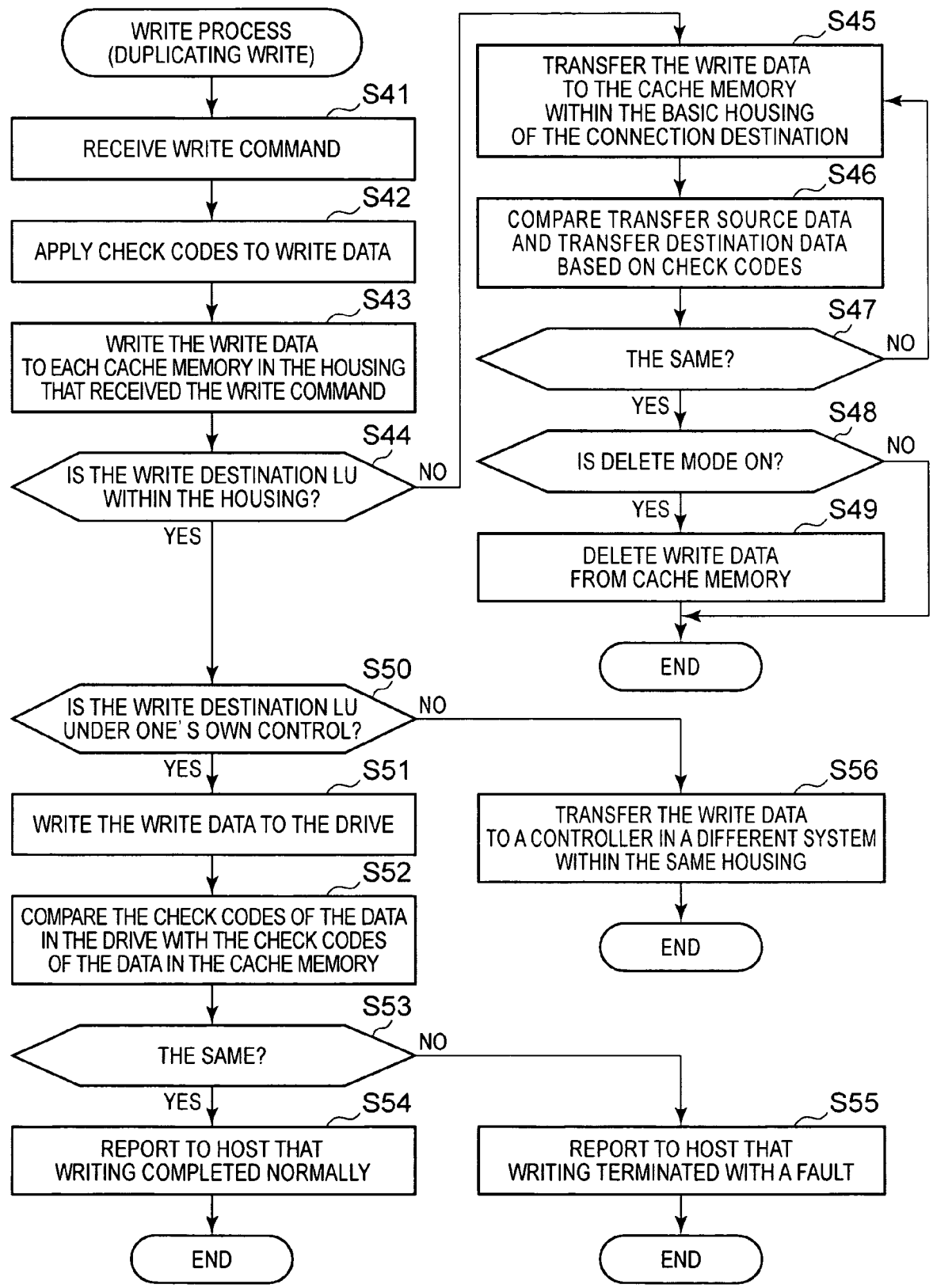
FIG. 13 is a flowchart showing the write process according to the second write mode.

FIG. 13 is a flowchart showing the write process according to the second write mode. For ease of understanding, the explanation is focused on the operation of the controller 100A. When the controller 100A receives a write command from the host 1 (S41), check codes are applied to the write data (S42).

The controller 100A multiply controls the write data received from the host 1 within the housing in which the write data was received (S43). In other words, the controller 100A stores the write data received from the host 1 in the cache memory 104 within the controller 100A, and transfers the write data to the other controller 100B within the same housing, and the write data is stored in the cache memory 104 within the controller 100B.

The controller 100A determines whether the logical volume that is the write destination of the write command received at step S41 is under the control of the basic housing in which the controller 100A is provided (S44).

If the logical volume that is the subject of the write command is under the control of another basic housing (S44: NO), in other words, in this example if the write command concerns a logical volume 230 under the control of the second storage control device 20, the controller 100A transfers the write data to the cache memory 204 of the responsible controller 200A (S45). In other words, the controller 100A transfers the write data to the cache memory 204 corresponding to the storage area of the logical volume 230 where the data is to be written. The data transfer control circuit 203 within the controller 200A generates check codes for the write data received from the controller 100A.

The controller 100A that is the source of the transfer of the write data compares the check codes from prior to transfer with the check codes after transfer (S46), and determines whether the two sets of check codes are the same (S47). If the two sets of check codes are not the same (S47: NO), the controller 100A re-transfers the write data to the controller 200A (S45).

If both sets of check codes are the same (S47: YES), the controller 100A determines whether delete mode has been set (S48). Delete mode is the mode for deleting the write data stored in the cache memory 104 of the controller 100A which is the source of the write data transfer. As stated later, write mode and delete mode can be set separately for each logical volume 130, 230 by the user.

If the delete mode is set (S48: YES), the controller 100A deletes the write data stored in the cache memory 104 within the controller 100A (S49). In this way, it is possible to minimize the use of cache memory by write data for logical volumes that are outside the responsibility of the controller.

If the logical volume that is the subject of the write command received at step S41 is under the control of the basic housing associated with the controller 100A which receives the command (S44: YES), the controller 100A determines whether the logical volume 130 that is the subject of the write command is under the control of the controller 100A (S50).

If the write command concerns the logical volume 130 that is under the control of the controller 100A (S50: YES), the controller 100A writes the write data to the prescribed storage drive 110 (S51), and compares the check codes as described above (S52). If the check codes applied at S42 and the check codes calculated when writing the write data to the storage drive 110 are the same (S53: YES), the controller 100A notifies the host 1 that writing was terminated normally (S54). If the check codes are not the same (S53: NO), the controller 100A notifies the host 1 that processing the write command terminated with a fault (S55).

On the other hand, if the write command concerns a logical volume 130 under the control of the controller 100B (S50: NO), the controller 100A transfers the write data received from the host 1 to the controller 100B via the inter-controller communication path P1, and stores the write data in the cache memory 104 within the controller 100B (S56).

Figure 14:
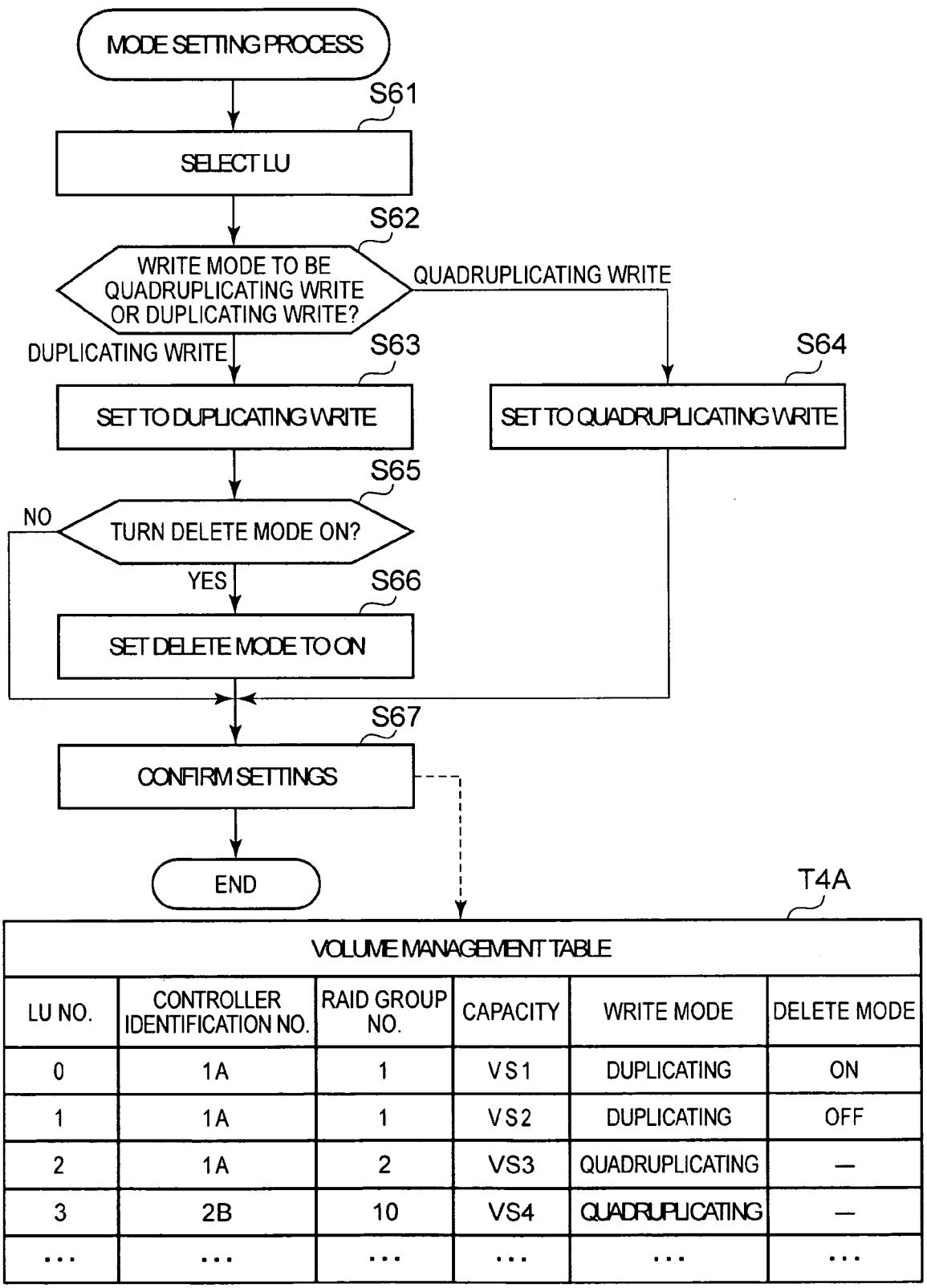
FIG. 14 is a flowchart showing the mode setting process.

FIG. 14 is a flowchart showing the process of setting the first write mode and the second write mode described above for each logical volume. A user can use a user interface for carrying out the mode setting process via storage control software or similar provided on the host 1.

First, a user selects a logical volume (S61), then the write mode to be applied to the logical volume is selected (S62). If the write mode selected by the user is the duplicating write mode, then the duplicating write mode is set for the logical volume selected at S61 (S63). If the write mode selected by the user is the quadruplicating write mode, then the quadruplicating write mode is set for the logical volume selected at S61 (S64).

If the duplicating write mode is selected, the user can decide whether to set the delete mode ON or not (S65). If the user wishes to use the delete mode (S65: YES), the delete mode is applied to the logical volume selected at S61 (S66). Details of the settings selected by the user are registered in the volume management table T4A (S67).

Compared with the table T4 shown in FIG. 7, the table T4A shown in FIG. 14 includes information for specifying the type of write mode and information for determining whether the delete mode is ON or OFF. Therefore, each controller can control the transfer of data to cache memory and similar by using this volume management table T4A.

In the present embodiment configured in this way, the execution destination (responsible controller) of a command received from the host 1 can be determined on the storage control device side 10, 20, and the command can be transferred to the controller that must process the command. In this way, when a plurality of storage control devices 10, 20 are connected, the processing path can be switched on the storage control device 10, 20 side without the awareness of the host 1, and without the need for special software such as path switching software on the host 1. Therefore, a plurality of storage control devices 10, 20 can be easily connected and used at low cost, the number of hosts 1 that can be connected can be increased, and the usability can be increased.

In the present embodiment, the user can freely select a plurality of types of write mode, and the same write data can be multiply controlled using the cache memory 104, 204 in the separate housings. In other words, the reliability as a whole can be increased by connecting the storage control devices 10, 20.

In the present embodiment, the write mode and the delete mode can be set for each logical volume. In this way, it is possible to set the reliability level as appropriate for logical volume units, and improve the usability.

Second Embodiment

Figure 15A:
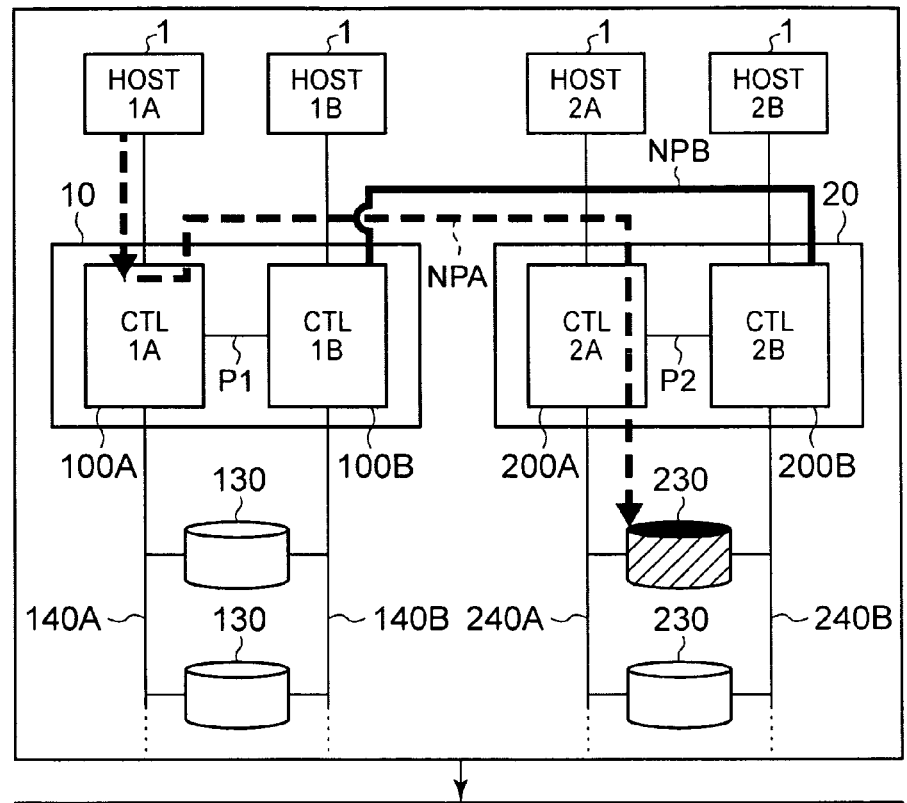
FIG. 15 is an explanatory diagram schematically showing the configuration of the storage system according to the second embodiment, (a) shows the case of a normal transmission path, and (b) shows the case of a detour from the transmission path on which a fault has occurred.
Figure 15B:
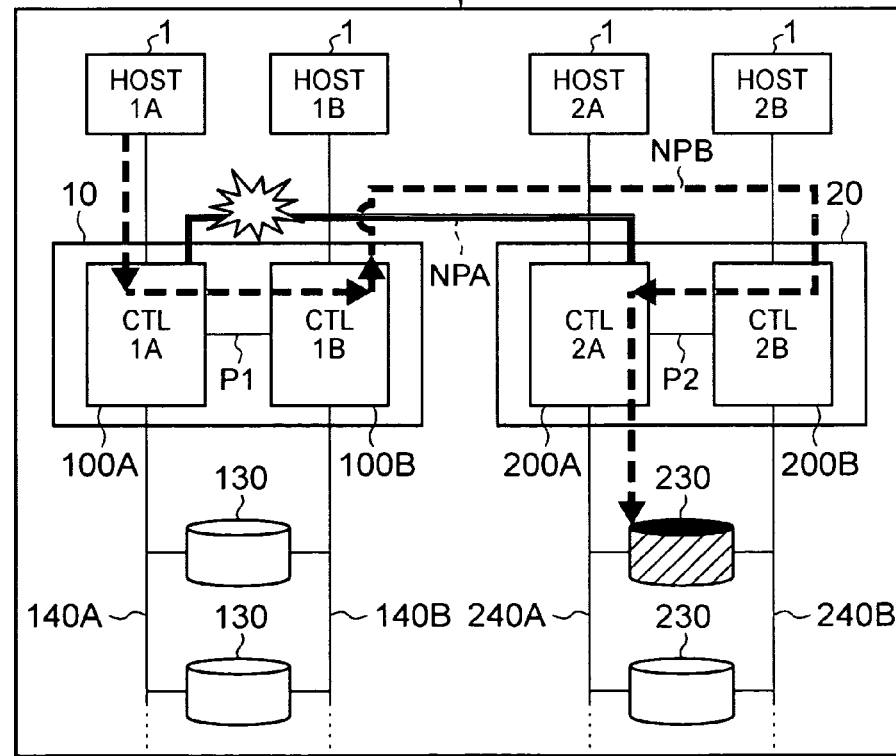
Figure 16:
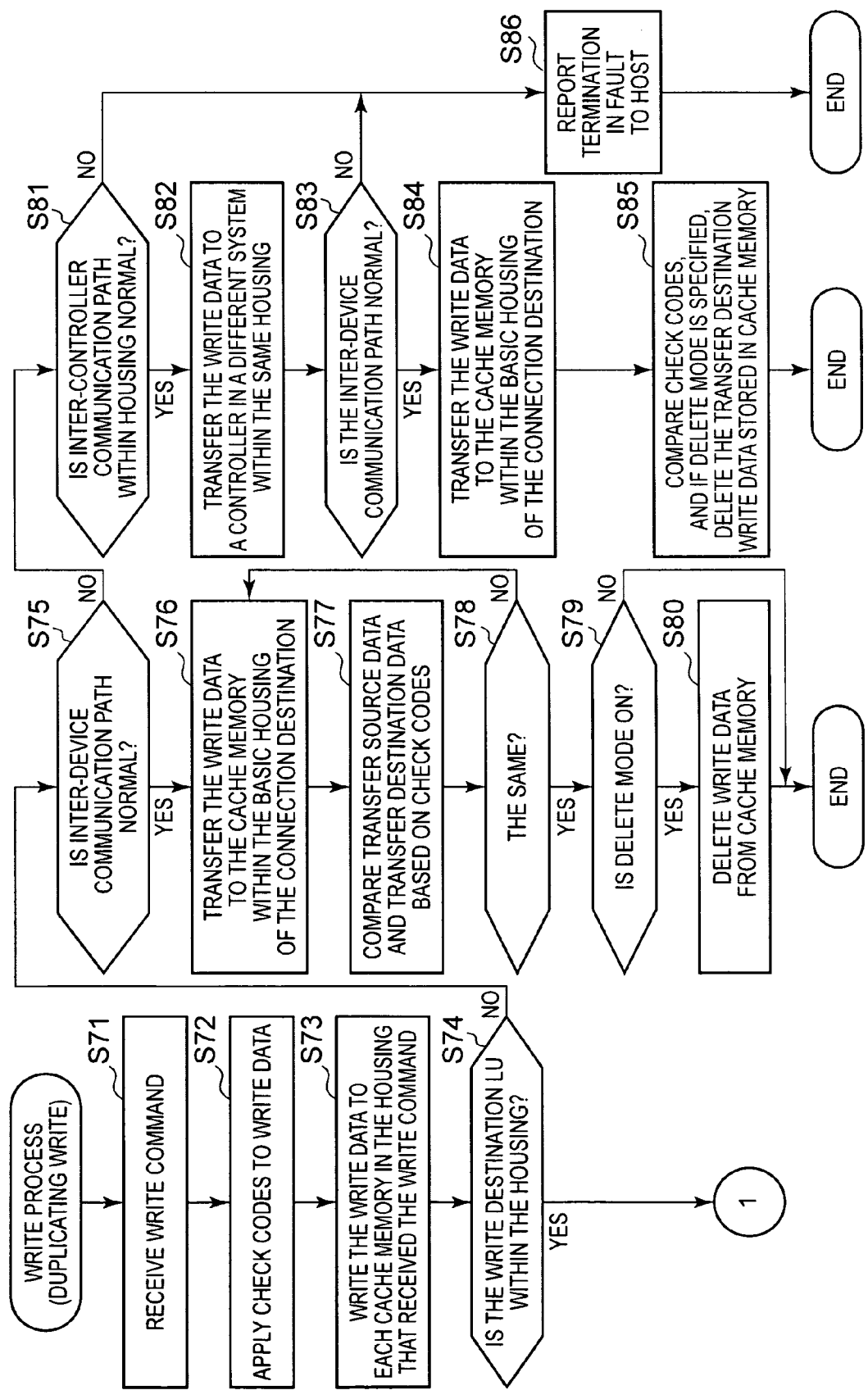
FIG. 16 is a flowchart showing the write process according to the second write mode.
Figure 17:
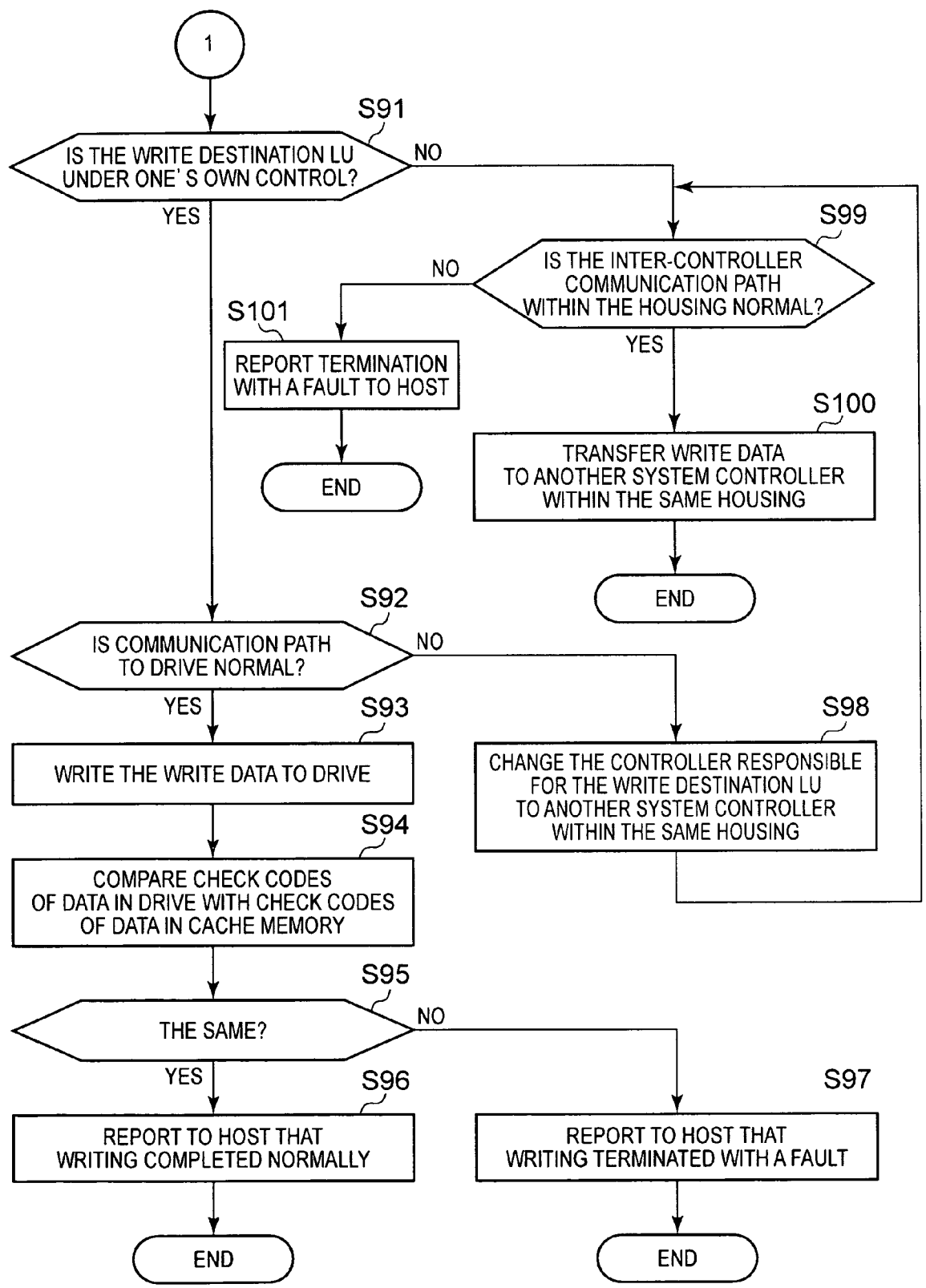
FIG. 17 is a continuation of the flowchart in FIG. 16.

The following is an explanation of the second embodiment based on FIGS. 15 through 17. Each of the following embodiments including the present embodiment are examples of variations of the first embodiment. Therefore, duplicated explanations are omitted, and the characteristic parts of each embodiment are described.

FIG. 15 is an explanatory diagram showing an obstacle avoidance method (path changing method) when storage control devices 10, 20 are connected. FIG. 15A shows the normal state before the occurrence of a fault. An example is explained for the case where the controller 100A receives a write command to write to a logical volume 230 under the control of the controller 200A.

As shown by the broken line in FIG. 15A, in normal conditions the controller 100A transfers the write data to the cache memory 204 within the controller 200A which is the responsible controller, via the inter-device communication path NPA. The controller 200A stores the write data written to the cache memory 204 in the logical volume 230 where it is to be written via the communication path 240A.

FIG. 15B shows the case where a communication fault has occurred in the inter-device communication path NPA. When a fault occurs, the controller 100A transfers the write data to the controller 200A which is the responsible controller via the other controller 100B within the same basic housing, and stores the write data in the cache memory 204 within the controller 200A, as shown by the broken line in the figure. In other words, the write data is transferred through the path controller 100A→controller 100B→inter-device communication path NPB→controller 200B→controller 200A.

FIG. 16 is a flowchart showing the process when a fault is avoided. Here the explanation is provided for an example where the controller 100A carries out the duplicating write mode. First, when the controller 100A receives a write command from the host 1 (S71), check codes are applied to the write data (S72), next the write data is stored in each cache memory 104, 104 within the same basic housing (S73).

The controller 100A determines whether the logical volume that is the write destination is under the control of the basic housing in which the controller 100A is provided (S74). If the logical volume that is the write destination is not under the control of the basic housing in which the controller 100A is provided (S74: NO), the controller 100A determines whether the inter-device communication path NPA is normal or not (S75).

If the inter-device communication path NPA is normal (S75: YES), the controller 100A transfers the write data to the cache memory 204 within the controller 200A which is the responsible controller, via the inter-device communication path NPA (S76). Then the controller 100A compares the check codes from before and after transfer (S77), and determines whether both sets of check codes are the same (S78). If the two sets of check codes are not the same (S78: NO), the procedure returns to S76. If the two sets of check codes are the same (S78: YES), the controller 100A determines whether the delete mode of the logical volume that is to be written to is set to ON (S79). If the delete mode is set to ON (S79: YES), the controller 100A deletes the write data from the cache memory 104 within the controller 100A (S80).

On the other hand, if there is a fault on the inter-device communication path NPA connecting the controller 100A which is the connection source (transfer source) and the controller 200A which is the connection destination (transfer destination) (S75: NO), the controller 100A searches for a path to avoid the fault.

The controller 100A determines whether the inter-controller communication path P1 for connecting to the other controller 100B provided within the same basic housing is normal (S81). If the inter-controller communication path P1 is normal (S81: YES), the controller 100A transfers and stores the write data in the cache memory 104 of the controller 100B (S82).

The controller 100A determines whether the inter-device communication path NPB connecting the controller 100B and the controller 200B is normal (S83). If the inter-device communication path NPB is normal (S83: YES), the controller 100A transfers and records the write data stored in the cache memory 104 of the controller 100B in the cache memory 204 of the controller 200A (S84). In other words, the write data is stored in the cache memory 204 of the controller 200A through the path inter-device communication path NPB→controller 200B→inter-controller communication path P2→controller 200A.

The controller 100A checks the check codes before and after transfer, and if the check codes are the same, the controller 100A confirms whether the delete mode is set, and if the delete mode is set the controller 100A deletes the write data stored in the cache memory 104, 104 of the controller 100A and the controller 100B (S85).

On the other hand, if there is a fault in the communication path P1 between the controller 100A and the controller 100B (S81: NO), or if there is a fault on the communication path NPB between the controller 100B and the controller 200B (S83: NO), write data cannot be transferred to the controller 200A which is the responsible controller. Therefore the controller 100A notifies the host 1 that it was not possible to terminate the write command normally (S86) FIG. 17 is a continuation of the flowchart in FIG. 16. If the answer at S74 in FIG. 16 is NO, in other words, if the logical volume that is to be written to is under the control of the basic housing that the controller 100A belongs to, the controller 100A determines whether the logical volume that is to be written to is under the control of the controller 100A (S91).

If the logical volume that is to be written to is under the control of the controller 100A (S91: YES), the controller 100A determines whether the communication path 140A for accessing the storage drive 110 is normal (S92). If the communication path 140A is functioning normally (S92: YES), the controller 100A writes the write data to the prescribed storage drive 110 (S93). Then the controller 100A compares the check codes of the write data stored in the cache memory 104 of the controller 100A with the check codes of the write data written to the storage drive 110 (S94), and determines whether the two sets of check codes are the same (S95).

If the two sets of check codes are the same (S95: YES), the controller 100A notifies the host 1 that the write command was terminated normally (S96). If the two sets of check codes are not the same (S95: NO), the controller 100A reports to the host 1 that there was a failure in the write command process (S97).

If there is a fault on the communication path 140A for accessing the storage drive 110 (S92: NO), the controller 100A changes the controller responsible for the logical volume which is to be written to from the controller 100A to the controller 100B, and proceeds to S99.

If the logical volume that is to be written to is not under the control of the controller 100A, but under the control of the other controller 100B belonging to the same basic housing (S91: NO), in other words, if the controller 100B is the responsible controller for processing the write command, the controller 100A determines whether the inter-controller communication path P1 is normal (S99).

If the inter-controller communication path P1 is normal (S99: YES), the controller 100A transfers and stores the write data in the cache memory 104 within the controller 100B (S100). If there is a fault in the inter-controller communication path P1 (S99: NO), it is not possible to find a detour path, so the controller 100A reports to the host 1 that the write command was terminated in a fault (S101). Even if the answer at S99 is determined to be NO, if the inter-device communication paths NPA, NPB are normal, it is possible for the controller 100A to transfer the write data to the cache memory 104 of the controller 100B through the path controller 100A→NPA→controller 200A→P2→controller 200B→NPB→controller 100B.

Also, if the answer at S92 is NO, the controller 100A can access the storage drive 110 using the alternative path 141A. If a fault has occurred on the alternative path 141A, the controller 100A may change the responsible controller to the controller 100B.

The present embodiment configured in this way has the same effect as the first embodiment. In addition, if a fault occurs on a communication path, the present embodiment automatically searches for an available detour path, using the communication paths P1, P2 within each storage control device 10, 20 and the communication paths NPA, NPB between storage control devices 10, 20. In this way, the resistance to faults when storage control devices 10, 20 are connected can be increased, and the reliability can also be increased.

Third Embodiment

Figure 18:
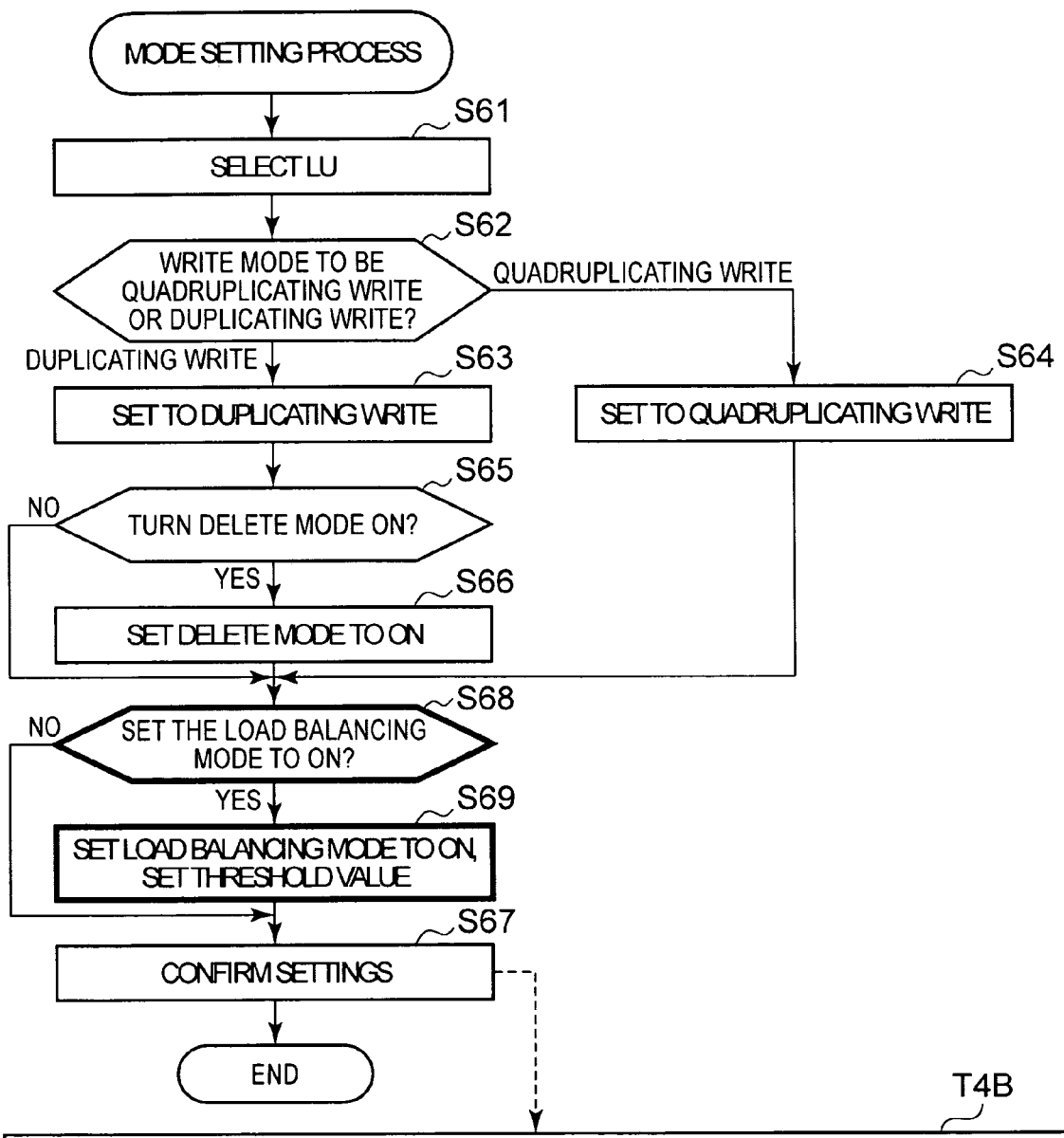
FIG. 18 is a flowchart showing the mode setting process used in a storage system according to the third embodiment.
Figure 19:
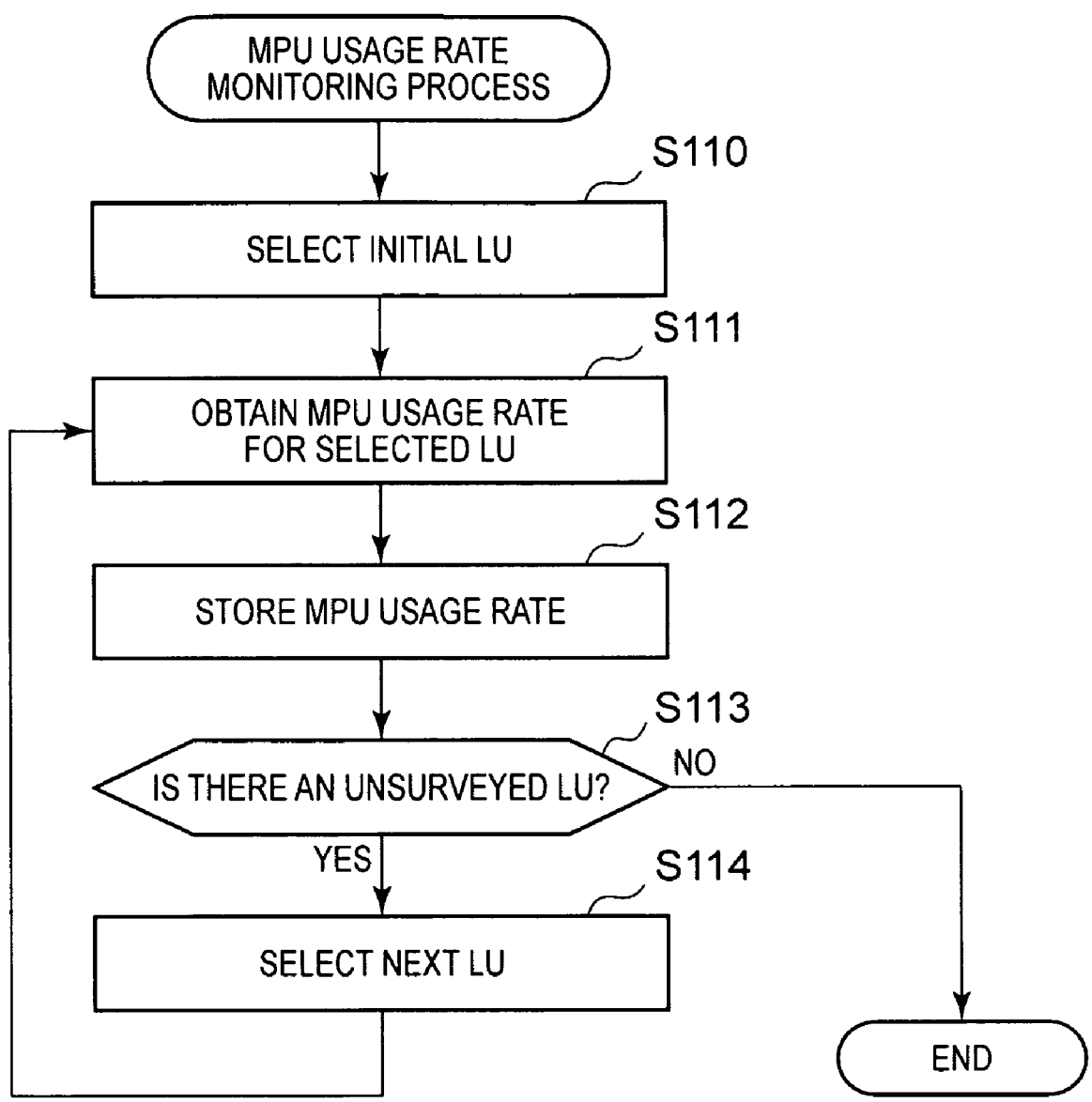
FIG. 19 is a flowchart showing the process of monitoring the processor usage ratio.
Figure 20:
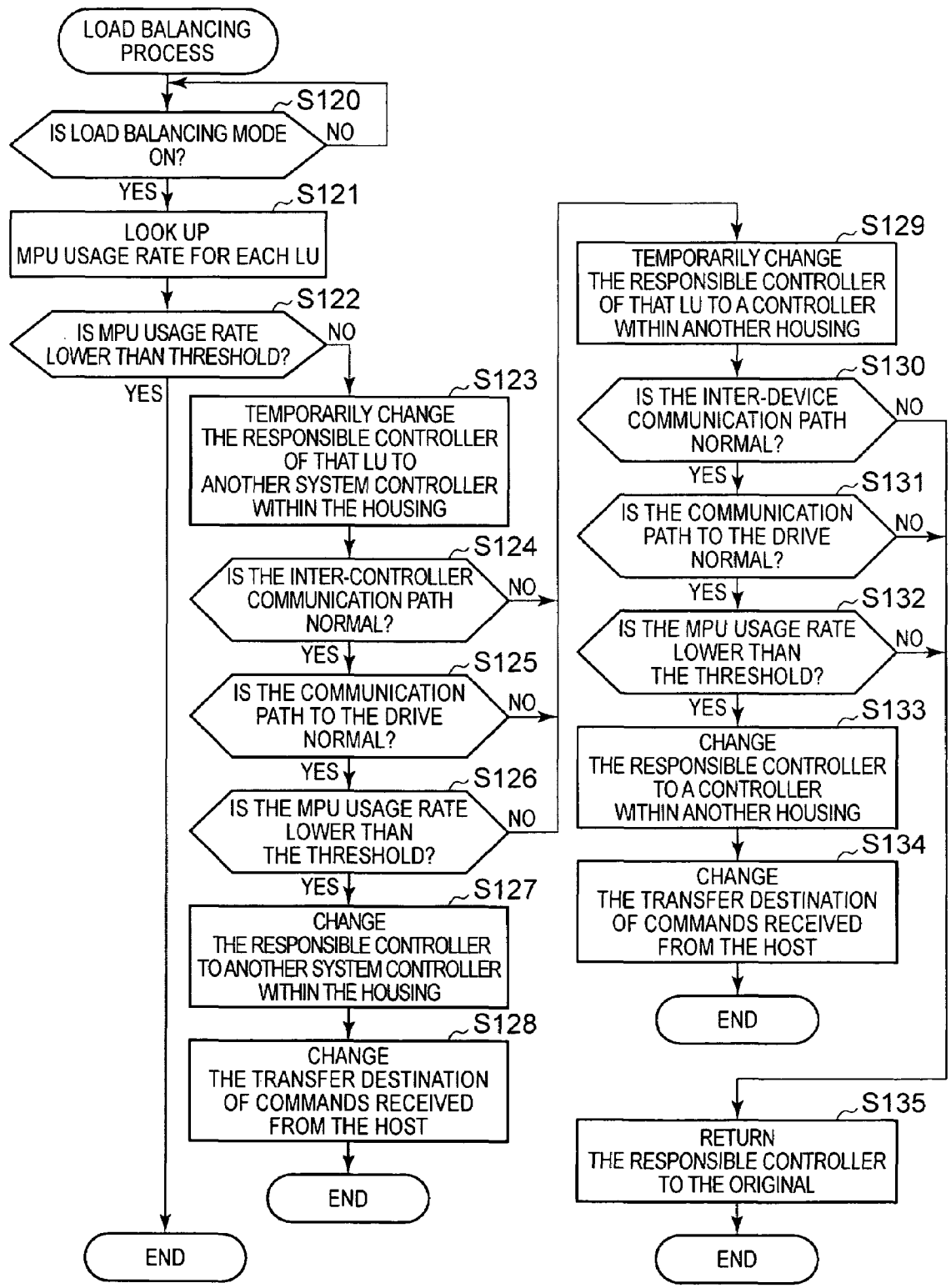
FIG. 20 is a flowchart showing the load balancing process.

The following is an explanation of the third embodiment based on FIGS. 18 through 20. In the present embodiment, the load within the storage control devices 10, 20 is dispersed. FIG. 18 is a flowchart showing the mode setting process. The flowchart in FIG. 18 includes new steps S68, S69 in addition to the steps shown in FIG. 14.

A user can select whether to set the load balancing mode to ON for the logical volume selected at S61 (S68). If the user wishes to use the load balancing mode (S68: YES), the load balancing mode is set to ON for the selected logical volume (S69). Also, the user can set an appropriate threshold value for executing the load balancing mode (S69).

As shown in the volume management table T4B in FIG. 18, in the present embodiment information indicating the setting status of the load balancing mode and information showing the threshold value to be used in the load balancing mode is registered in the table T4B.

FIG. 19 is a flowchart showing a process for monitoring the usage rate (load) on each processor 105, 205. Each controller 100, 200 monitors the processor usage rate for each logical volume 130, 230 under their own control. The following is an explanation using the controller 100A as an example.

First, the controller 100A selects the first logical volume 130 (S110), and obtains the usage rate of the processor 105 for the selected logical volume 130 (S111). For example, if there are many access requests (write commands or read commands) to the selected logical volume 130, the processor usage rate for that logical volume 130 is high.

The controller 100A stores the obtained processor usage rate (S112). The processor 100A determines whether there is a logical volume 130 for which the load has not yet been surveyed (S113). If there is a logical volume 130 that has not yet been surveyed (S113: NO), the controller 100A selects the next logical volume 130 (S114), and obtains the processor usage rate for that logical volume 130 (S111, S112). In this way, the controller 100A periodically or irregularly surveys and monitors the processor usage rate for each logical volume 130 under its own control.

FIG. 20 is a flowchart showing the load dispersion process. The explanation is given for an example where the controller 100A executes the process. When the controller 100A receives a command from the host 1, the controller 100A determines whether the load dispersion mode for the logical volume 130 that is the subject of the command is set to ON (S120).

If the load dispersion mode is set to ON (S120: YES), the controller 100A refers to the processor usage rate obtained in the process shown in FIG. 19 (S121). The controller 100A determines whether the processor usage rate for the logical volume 130 that is the subject of the command is below the threshold value (S122).

If the processor usage rate is below the threshold value (S122: YES), a high load state has not occurred, so the controller 100A completes the present process normally without carrying out load dispersal. On the other hand, if the processor usage rate is higher than the threshold value (S122: NO), a high load state has occurred in the logical volume 130 that is the subject of the command. Therefore, the controller 100A temporarily changes the responsible controller for the logical volume 130 with the high load to the other controller 100B within the same basic housing (S123).

If the inter-controller communication path P1 is normal (S124: YES), and if the communication path 140B to access the storage drive 110 from the temporarily changed responsible controller 100B is normal (S125: YES), and if the processor usage rate of the controller 100B is lower than the threshold value (S126: YES), the controller 100A confirms the change of responsible controller for the logical volume 130 with the high load (S127).

In this way, the controller responsible for reading and writing data for the logical volume 130 with the high load is changed from the controller 100A to the controller 100B within the same basic housing. Also, the controller 100A changes the setting of the command transmission function of the host side protocol chip 101 within the controller 100A for the logical volume 130 with the high load (S128). Thereafter, if a command is received concerning the logical volume 130 with a high load, the command is transferred from the host side protocol chip 101 of the controller 100A to the data transfer control circuit 103 of the controller 100B.

On the other hand, if there is a fault on the communication path P1 (S124: NO), or if there is a fault on the communication path 140B (S125: NO), or if the processor usage rate of the controller 100B is greater than the threshold value (S126: NO), the controller 100B cannot be used as the controller responsible for the logical volume 130 with the high load.

Therefore, the controller 100A temporarily selects the controller 200A belonging to another basic housing as the controller responsible for the logical volume 130 with the high load (S129). In other words, the controller responsible for reading and writing data for the logical volume 130 with the high load is temporarily changed from the controller 100A to the controller 200A.

Then if the inter-device communication path NPA is normal (S130: YES), and the communication path 240A for accessing the storage drive 210 from the controller 200A is normal (S131: YES), and if the processor usage rate for the controller 200A is lower than the threshold value (S132: YES), the controller 100A formally changes the responsible controller for the logical volume 130 with the high load from the controller 100A to the controller 200A (S133).

If there is a fault on the inter-device communication path NPA (S130: NO), or if there is a fault on the communication path 240A for accessing the storage drive 210 (S131: NO), or if the processor usage rate of the controller 200A is greater than the threshold value (S132: NO), the controller 100A restores the original controller (in this case, the controller 100A) to be the controller responsible for the logical volume 130 with the high load (S135).

The present embodiment configured in this way has the same effect as the first embodiment described previously. In addition, in the present embodiment, in the mutually connected storage control devices 10, 20, the controller responsible for a logical volume with a high load can be automatically changed. In this way, the processors of the storage control devices 10, 20 can be effectively utilized, and the reduction in responsiveness can be minimized.

Fourth Embodiment

Figure 21:
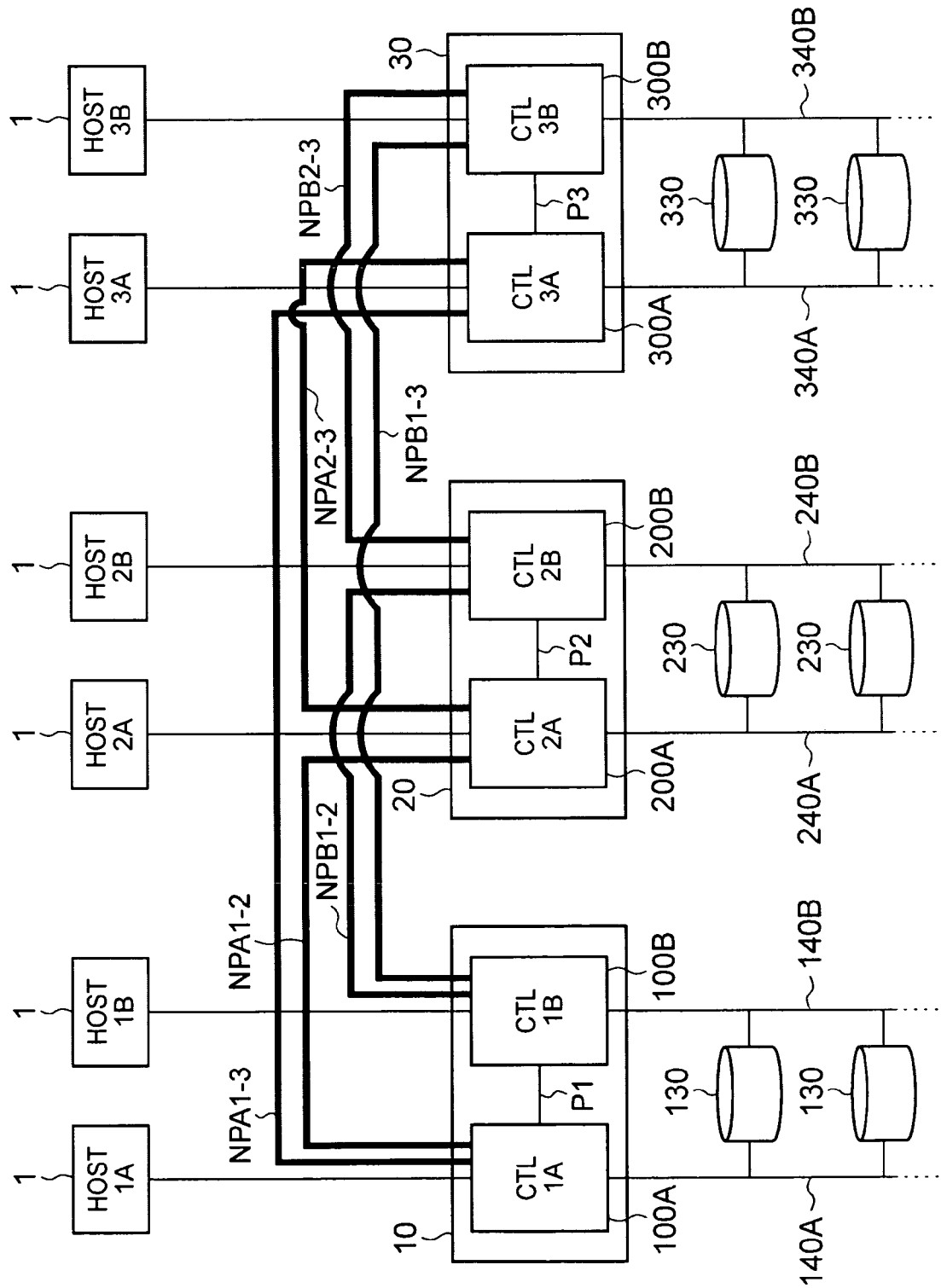
FIG. 21 is an explanatory diagram schematically showing the configuration of a storage system according to the fourth embodiment.

The following is an explanation of the fourth embodiment based on FIG. 21. In each of the previous embodiments, an example was given in which two storage control devices 10, 20 were connected, but as shown in the configuration explanation diagram of FIG. 21, three or more storage control devices 10, 20, 30 can be connected.

In the storage system shown in FIG. 21, the first storage control device 10, the second storage control device 20, and a third storage control device 30 are mutually connected. Each controller 100A, 100B, 200A, 200B, 300A, 300B of each storage control device 10, 20, 30 includes a plurality of inter-device communication circuits. Each controller is connected to the controllers in other basic housings via the plurality of inter-device communication circuits and the inter-device communication paths.

In the figure, the reference numeral "NPA1-2" indicates the inter-device communication path connecting the controller 100A of the A system within the first storage control device 10 and the controller 200A of the A system within the second storage control device 20. In the same way, "NPB2-3" indicates the inter-device communication path connecting the controller 200B of the B system within the second storage control device 20 and the controller 300B of the B system within the third storage control device 30.

The present embodiment configured in this way has the same effect as the first embodiment described above. In addition, in the present embodiment three or more storage control devices 10, 20, 30 can be connected, so more hosts 1 can be connected.

Fifth Embodiment

Figure 22:
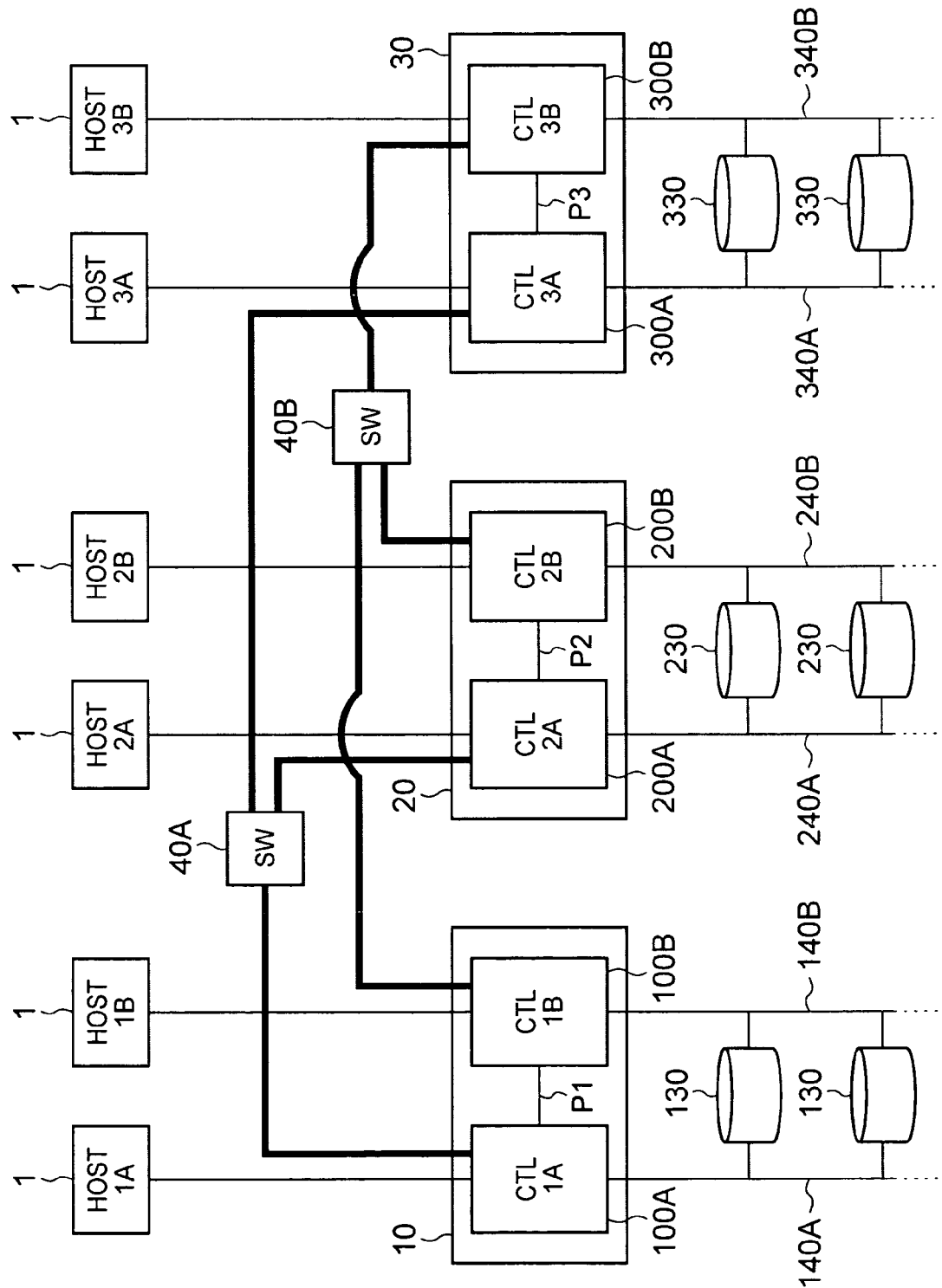
FIG. 22 is an explanatory diagram showing the configuration of a storage system according to the fifth embodiment.

The following is an explanation of the fifth embodiment based on FIG. 22. In the present embodiment, as shown in the configuration explanation diagram FIG. 22, three or more storage control devices 10, 20, 30 are mutually connected using switches 40A, 40B.

Each of the switches 40A, 40B can be provided in any of the basic housings. One switch 40A is associated with the A system and is connected to each controller 100A, 200A, 300A. The other switch 40B is associated with the B system and is connected to each controller 100B, 200B, 300B. In this way, a storage system can be configured with three or more storage control devices 10, 20, 30 by providing a switch for each control system.

The present embodiment configured in this way has the same effect as the first embodiment described above. In addition, in the present embodiment the number of hosts connected can be increased compared with the first embodiment. Also, in the present embodiment the switches 40A, 40B are used, so the configuration of each controller can be simplified compared with the fourth embodiment.

Sixth Embodiment

The following is an explanation of the sixth embodiment based on FIG. 23. FIG. 23 is a block diagram showing the controller 100A of a storage control device 10 according to the present embodiment. In the present embodiment, the host side protocol chip 101 is connected to the inter-device communication circuit 103F.

In this way, in the present embodiment the storage control device 10 can be operated independently or the number of host connections can be increased. Also, if the user wishes to further increase the number of host connections, as stated for the first embodiment, a storage control device 20 can be added, and the storage control device 10 and the storage control device 20 can be connected. In this case, the controller 100A, 100B should be exchanged for controllers having the configuration described in the first embodiment.

The present invention is not limited to the embodiments described above. A person skilled in the art can make many kinds of additions and changes and so on within the scope of the present invention.

What is claimed is:

1. A storage system, comprising:
 a first storage control device being configured to be coupled to at least a first one of a plurality of host computers and comprising a first controller and a second controller, both of the first controller and the second controller available to access a first plurality of logical volumes configured from a first portion of a first plurality of storage mediums of a first Redundant Array of Inexpensive Disks (RAID) group via a first path and available to access a second plurality of logical volumes configured from a second portion of the first plurality of storage mediums via a second path, the first controller responsible for writing data to the first plurality of logical volumes, the second controller responsible for writing data to the second plurality of logical volumes; and
 a second storage control device being configured to be coupled to at least a second one of the plurality of host computers and comprising a third controller and a fourth controller, both of the third controller and the fourth controller available to access a third plurality of logical volumes configured from a first portion of a second plurality of storage mediums of a second RAID group via a third path and available to access a fourth plurality of logical volumes configured from a second portion of the second plurality of storage mediums via a fourth path, the third controller responsible for writing data to the third plurality of logical volumes, the fourth controller responsible for writing data to the fourth plurality of logical volumes,
 wherein the first controller manages processor usage rate identifying usage rate of a processor in the first controller used for each of the first plurality of logical volumes on the logical volume basis,
 wherein, if the processor usage rate of a first logical volume of the first plurality of logical volumes is higher than a threshold, the first controller temporarily changes a responsible controller for writing data to the first logical volume to the second controller in the first storage control device for checking whether or not the change of the responsible controller for writing data to the first logical volume can be confirmed, and
 wherein the first controller, based on write execution of the second controller as the responsible controller, further temporarily changes the responsible controller for writing data to the first logical volume to the third controller in the second storage control device for checking whether or not the change of the responsible controller for writing data to the first logical volume can be confirmed.

2. A storage control device according to claim 1, wherein the first controller confirms the change of the responsible controller for writing data to the first logical volume after monitoring the write execution of the second controller as the responsible controller in status, in which the second controller is the responsible controller.

3. A storage control device according to claim 1, wherein the first controller restores the change of the responsible controller to the first controller after monitoring write execution of the third controller as the responsible controller in status, in which the third controller is the responsible controller.

4. A storage control device according to claim 1, wherein the second controller manages another processor usage rate identifying usage rate of a processor in the second controller used for each of the second plurality of logical volumes on the logical volume basis,
 the second controller, if the another processor usage rate of a second logical volume of the second plurality of logical volumes is higher than a threshold, temporarily changes a responsible controller for writing data to the second logical volume to the first controller in the first storage control device for checking whether or not the change of the responsible controller for writing data to the second logical volume can be confirmed, and
 the first controller, based on write execution of the first controller as the responsible controller, further temporarily changes the responsible controller for writing data to the second logical volume to the fourth controller in the second storage control device for checking whether or not the change of the responsible controller for writing data to the second logical volume can be confirmed.

5. A storage control device according to claim 1, wherein the first controller is directly coupled to the second controller in the first storage control device.

6. A storage control device according to claim 1, wherein the first controller is directly coupled to the third controller in the first storage control device without via a switch.

7. A management method for a storage system, the storage system comprising a first storage control device and a second storage control device, the first storage control device being configured to be coupled to at least a first one of a plurality of host computers and comprising a first controller and a second controller, both the first controller and the second controller available to access a first plurality of logical volumes configured from a first portion of a first plurality of storage mediums of a first Redundant Array of inexpensive Disks (RAID) group via a first path and available to access a second plurality of logical volumes configured from a second portion of the first plurality of storage mediums via a second path, the second storage control device being configured to be coupled to at least a second one of the plurality of host computers and comprising a third controller and a fourth controller, both of the third controller and the fourth controller available to access a third plurality of logical volumes configured from a first portion of a second plurality of storage mediums of a second RAID group via a third path and available to access a fourth plurality of logical volumes configured from a second portion of the second plurality of storage mediums via a fourth path, the management method comprising:

setting the first controller as a responsible controller for writing data to each of the first plurality of logical volumes;

setting the second controller as a responsible controller for writing data to each of the second plurality of logical volumes;

setting the third controller as a responsible controller for writing data to each of the third plurality of logical volumes;

setting the fourth controller as a responsible controller for writing data to each of the fourth plurality of logical volumes;

managing processor usage rate identifying usage rate of a processor in the first controller used for each of the first plurality of logical volumes on the logical volume basis;

temporarily changing, if the processor usage rate of a first logical volume of the first plurality of logical volumes is higher than a threshold, the responsible controller for writing data to the first logical volume to the second controller in the first storage control device for checking whether or not the change of the responsible controller for writing data to the first logical volume can be confirmed; and further temporarily changing, based on write execution of the second controller as the responsible controller, the responsible controller for writing data to the first logical volume to the third controller in the second storage control device for checking whether or not the change of the responsible controller for writing data to the first logical volume can be confirmed.

8. A management method according to claim 7, further comprising:

confirming the change of the responsible controller for writing data to the first logical volume after monitoring the write execution of the second controller as the responsible controller in status, in which the second controller is the responsible controller.

9. A management method according to claim 7, further comprising:

restoring the change of the responsible controller to the first controller after monitoring write execution of the third controller as the responsible controller in status, in which the third controller is the responsible controller.

10. A management method according to claim 7, further comprising:

managing another processor usage rate identifying usage rate of a processor in the second controller used for each of the second plurality of logical volumes on the logical volume basis;

temporarily changing, if the another processor usage rate of a second logical volume of the second plurality of logical volumes is higher than a threshold, the responsible controller for writing data to the second logical volume to the first controller in the first storage control device for checking whether or not the change of the responsible controller for writing data to the second logical volume can be confirmed; and further temporarily changing, based on write execution of the first controller as the responsible controller, the responsible controller for writing data to the second logical volume to the fourth controller in the second storage control device for checking whether or not the change of the responsible controller for writing data to the second logical volume can be confirmed.

11. A management method according to claim 7, wherein the first controller is directly coupled to the second controller in the first storage control device.

12. A management method according to claim 7, wherein the first controller is directly coupled to the third controller in the first storage control device without via a switch.

* * * * *